(12) United States Patent
Hooper

(10) Patent No.: US 8,014,034 B2
(45) Date of Patent: Sep. 6, 2011

(54) IMAGE CONTRAST ENHANCEMENT

(75) Inventor: David Sheldon Hooper, Victoria (CA)

(73) Assignee: ACD Systems International Inc., Victoria, British Columbia (CA)

( * ) Notice: Subject to any disclaimer, the term of this patent is extended or adjusted under 35 U.S.C. 154(b) by 1395 days.

(21) Appl. No.: 11/106,339

(22) Filed: Apr. 13, 2005

(65) Prior Publication Data

US 2006/0232823 A1    Oct. 19, 2006

(51) Int. Cl.
*G06T 5/00* (2006.01)
(52) U.S. Cl. ....... 358/3.27; 358/1.9; 358/3.21; 358/518; 358/532
(58) Field of Classification Search .............. 382/168, 382/162, 169, 170, 172, 254, 270, 274, 276; 358/518, 3.23, 3.27, 3.29, 530, 523–525, 358/1.13, 1.1, 1.14, 1.15, 1.9, 1.19; 709/217, 709/224, 223, 249, 238
See application file for complete search history.

(56) References Cited

U.S. PATENT DOCUMENTS

| | | | |
|---|---|---|---|
| 4,384,336 | A | 5/1983 | Frankle et al. |
| 4,590,582 | A | 5/1986 | Umemura |
| 5,450,502 | A | 9/1995 | Eschbach et al. |
| 5,774,599 | A | 6/1998 | Muka et al. |
| 5,818,975 | A * | 10/1998 | Goodwin et al. .............. 382/274 |
| 5,991,456 | A | 11/1999 | Rahman et al. |
| 6,069,979 | A | 5/2000 | VanMetter |
| 6,212,304 | B1 | 4/2001 | Durg et al. |
| 6,317,521 | B1 | 11/2001 | Gallagher et al. |
| 6,633,684 | B1 | 10/2003 | James |
| 6,677,959 | B1 | 1/2004 | James |
| 6,731,790 | B1 | 5/2004 | Van de Velde et al. |
| 6,741,753 | B1 | 5/2004 | Moroney |
| 6,760,484 | B1 | 7/2004 | Sobol |

(Continued)

OTHER PUBLICATIONS

Arce, G.R. and Foster, R.E., "Detail-Preserving Ranked-Order Based Filters for Image Processing", *IEEE Transactions on Acoustics, Speech and Signal Processing*, vol. 37(1), Jan. 1989, pp. 83-98.

(Continued)

*Primary Examiner* — Twyler L Haskins
*Assistant Examiner* — Brendan McCommas
(74) *Attorney, Agent, or Firm* — Blakely, Sokoloff, Taylor & Zafman LLP

(57) ABSTRACT

A method for contrast enhancement for digital images, including filtering an original image having original color values, to generate a first filtered image corresponding to bright color values, and a second filtered image corresponding to dark color values, deriving local highlight multipliers by applying a highlight response curve to the first filtered image, the highlight response curve being a function of color value that increases from a response value of one, corresponding to a color value of zero, to a response value greater than one, corresponding to a maximum color value, deriving local shadow multipliers by applying a shadow response curve to the second filtered image, the shadow response curve being a function of color value that decreases from a response value greater than one, corresponding to a color value of zero, to a response value of one, corresponding to a maximum color value, deriving local offset values by applying an offset curve to the first filtered image, and processing the original image, including subtracting the local offset values from the original color values to generate shifted color values, multiplying the shifted color values by the local highlight multipliers, and further multiplying the shifted color values by the local shadow multipliers, thereby generating a contrast-enhanced image from the original image. A system and a computer-readable storage medium are also described.

44 Claims, 11 Drawing Sheets

U.S. PATENT DOCUMENTS

| | | | |
|---|---|---|---|
| 6,788,822 B1 | 9/2004 | Zhang et al. | |
| 6,804,409 B2 | 10/2004 | Sobol et al. | |
| 6,807,299 B2 | 10/2004 | Sobol | |
| 6,813,041 B1 | 11/2004 | Moroney et al. | |
| 6,822,762 B2 | 11/2004 | Moroney et al. | |
| 6,834,125 B2 | 12/2004 | Woodell et al. | |
| 6,842,543 B2 | 1/2005 | Woodell et al. | |
| 7,102,793 B2 * | 9/2006 | Lee et al. | 358/3.27 |
| 7,149,358 B2 * | 12/2006 | Langan | 382/214 |
| 7,319,787 B2 * | 1/2008 | Trifonov et al. | 382/168 |
| 2001/0030687 A1 * | 10/2001 | Kondo et al. | 348/97 |
| 2002/0154323 A1 | 10/2002 | Sobol et al. | |
| 2002/0154832 A1 | 10/2002 | Sobol | |
| 2002/0176113 A1 | 11/2002 | Edgar | |
| 2002/0186387 A1 | 12/2002 | Moroney et al. | |
| 2002/0196350 A1 | 12/2002 | J. Cooper | |
| 2003/0012448 A1 | 1/2003 | Kimmel et al. | |
| 2003/0016306 A1 | 1/2003 | Ogata et al. | |
| 2003/0026494 A1 | 2/2003 | Woodell et al. | |
| 2003/0072496 A1 | 4/2003 | Woodell et al. | |
| 2003/0138161 A1 | 7/2003 | Rising, III | |
| 2003/0156761 A1 | 8/2003 | Ogata et al. | |
| 2003/0161546 A1 | 8/2003 | Sobol et al. | |
| 2003/0215153 A1 | 11/2003 | Gindele et al. | |
| 2004/0081369 A1 * | 4/2004 | Gindele et al. | 382/274 |
| 2004/0091164 A1 | 5/2004 | Sakatani et al. | |
| 2004/0165086 A1 | 8/2004 | Spitzer et al. | |
| 2004/0174571 A1 | 9/2004 | Sobol | |
| 2004/0213478 A1 | 10/2004 | Chesnokov | |
| 2004/0264799 A1 | 12/2004 | Gallagher et al. | |
| 2005/0012831 A1 | 1/2005 | Yano | |
| 2005/0012832 A1 | 1/2005 | Yano | |
| 2005/0013506 A1 | 1/2005 | Yano | |
| 2005/0025356 A1 | 2/2005 | Fukuda | |
| 2005/0025378 A1 | 2/2005 | Maurer | |
| 2005/0030415 A1 | 2/2005 | Takizawa | |
| 2005/0052665 A1 | 3/2005 | Moroney | |
| 2005/0073702 A1 | 4/2005 | Shaked et al. | |
| 2005/0074163 A1 | 4/2005 | Shaked | |
| 2005/0074179 A1 | 4/2005 | Wilensky | |
| 2005/0074180 A1 | 4/2005 | Wilensky | |

OTHER PUBLICATIONS

Fitch, J.P., Coyle, E.J. and Gallagher, N. C., "Median Filtering by Threshold Decomposition", *IEEE Transactions on Acoustics, Speech and Signal Processing*, vol. 32(6), Dec. 1984, pp. 1183-1188.

Lee, Jong-Sen, "Digital Image Smoothing and the Sigma Filter", *Computer Vision, Graphics, and Image Processing*, vol. 24, 1983, pp. 255-269.

Saint-Marc, P., Chen, J.-S. and Medioni, G., "Adaptive Smoothing: A General Tool for Early Vision", *IEEE Transactions on Pattern Analysis and Machine Intelligence*, vol. 13(6), Jun. 1991, pp. 514-529.

Smith, S.M. and Brady, J.M., "SUSAN-A New Approach to Low Level Image Processing", *International Journal of Computer Vision*, vol. 23(1), 1997, pp. 45-78.

Yin, L., Yang, R., Gabbouj, M. and Neuvo, Y., "Weighted Median Filters: A Tutorial",*IEEE Transactions on Circuits and Systems-II: Analog and Digital Signal Processing*, vol. 43(3), Mar. 1996, pp. 157-192.

PCT Notification of the International Search Report and the Written Opinion of the International Searching Authority, or the Declaration, for PCT/CA2006/000591, date of mailing Aug. 2, 2006 (12 pages).

Ashikhmin, M., A Tone Mapping Algorithm for High Contrast Images,*Proceeding of the 13th Eurographics Workshop on Rendering, 2002*, 11 pages.

Braun, G. and Fairchild, M., Image Lightness Rescaling Using Sigmoidal Contrast Enhancement Functions, 39 pages.

Deriche, R., Fast Algorithms for Low-Level Vision, *IEEE Transactions on Pattern Analysis and Machine Intelligence*, vol. 12(1), Jan. 1990, pp. 78-87.

Dicarlo, J.M. and Wandell, B.A., Rendering high dynamic range images, *Proceedings of the SPIE Electronic Image 2000 Conference*, vol. 3965, 2000, 10 pages.

Durand, F., and Dorsey, J., Fast Bilateral Filtering for the Display of High-Dynamic-Range Images, *Proceedings of SIGGRAPH 2002*, 2002, 10 pages.

Fattal, R., Lischinski, D. and Werman, M., Gradient Domain High Dynamic Range Compression, *Proceedings of SIGGRAPH 2002*, 2002, 8 pages.

Larson, G.W., Rushmeier, H. and Piatko, C., A Visibility Matching Tone Reproduction Operator for High Dynamic Range Scenes, IEEE Transactions on Visualization and Computer Graphics, vol. 3(4), Oct.-Dec. 1997, pp. 291-306.

Pattanaik, S., Ferwerda, J.A., Fairchild, M.D. and Greenberg, D.P., A Multiscale Model of Adaptation and Spatial Vision for Realistic Image Display, *Proceedings of SIGGRAPH '98*, 1998, 12 pages.

Reinhard, E., Stark, M., Shirley, P. and Ferwerda, J., Photographic Tone Reproduction for Digital Images, 10 pages, 2000.

Socolinsky, D., Dynamic range constraints in image fusion and visualization, 6 pages, 2000.

Tumblin, J. and Hodgins, J.K., Two Methods for Display of High Contrast Images, 38 pages, 1997.

Tumblin, J. and Turk, G., LCIS: A Boundary Hierarchy for Detail-Preserving Contrast Reduction, *Proceedings of SIGGRAPH '99. 1999*, 8 pages.

Glasbey, C.A. and Jones, R., Fast computation of moving average and related filters in octagonal windows, *Pattern Recognition Letters*, vol. 18, 1997, 15 pages.

Wang, D.C.C. and Vagnucci, A.H., Gradient Inverse Weighted Smoothing Schema and the Evaluation of Its Performance, *Computer Graphics and Image Processing*, vol. 15, 1981, pp. 167-181.

G. A. Woodell, D. J. Jobson, Z. Rahman, G. D. Hines, Enhancement of imagery in poor visibility conditions, Sensors, and Command, Control, Communications, and Intelligence (C3I) Technologies for Homeland Security and Homeland Defense IV, Proc. SPIE 5778, (2005), 11 pages.

G. D. Hines, Z. Rahman, D. J. Jobson, G. A. Woodell, S.D. Harrah, Real-time Enhanced Vision System, Enhanced and Synthetic Vision 2005, Proc. SPIE 5802, (2005), 8 pages.

G. D. Hines, Z. Rahman, D. J. Jobson, G. A. Woodell, Single-Scale Retinex Using Digital Signal Processors, Global Signal Processing Expo (GSPx), (2004), 6 pages.

Z. Rahman, D. J. Jobson, G. A. Woodell, G. D. Hines, Impact of multi-scale retinex computation on performance of segmentation algorithms, Visual Information Processing XIII, Proc. SPIE 5438, (2004), 12 pages.

D. J. Jobson, Z. Rahman, G. A. Woodell, G. D. Hines, Automatic assessment and reduction of noise using edge pattern analysis in non-linear image enhancement, Visual Information Processing XIII, Proc. SPIE 5438, (2004), 9 pages.

G. D. Hines, Z. Rahman, D. J. Jobson, G. A. Woodell, DSP Implementation of the Retinex Image Enhancement Algorithm, Visual Information Processing XIII, Proc. SPIE 5438, (2004), 12 pages.

G. A. Woodell, Z. Rahman, D. J. Jobson, G. D. Hines, Enhanced images for checked and carry-on baggage and cargo screening, Sensors, and Command, Control, Communications, and Intelligence (C3I) Technologies for Homeland Security and Homeland Defense III, Proc. SPIE 5403, (2004), 8 pages.

D. J. Jobson, Z. Rahman, and G. A. Woodell, Feature visibility limits in the non-linear enhancement of turbid images, Visual Information Processing XII, Proc. SPIE 5108, (2003), 8 pages.

D. J. Jobson, Z. Rahman, and G. A. Woodell, The Statistics of Visual Representation, Visual Information Processing XI, Proc. SPIE 4736, (2002) (Invited paper), 11 pages.

Z. Rahman, D. J. Jobson, G. A. Woodell, and G. D. Hines, Multi-sensor fusion and enhancement using the Retinex image enhancement algorithm, Visual Information Processing XI, Proc. SPIE 4736, (2002), 9 pages.

Z. Rahman, D. J. Jobson, and G. A. Woodell, Retinex Processing for Automatic Image Enhancement, Human Vision and Electronic Imaging VII, SPIE Symposium on Electronic Imaging, Proc. SPIE 4662, (2002), 12 pages.

Z. Rahman, G. A. Woodell, and D. J. Jobson, Retinex Image Enhancement: Applications to Medical Images, presented at the NASA workshop on *New Partnerships in Medical Diagnostic Imaging*, Maryland, Jul. 17, 2001, 24 pages.

D. J. Jobson, Z. Rahman, and G. A. Woodell, The Spatial Aspect of Color and Scientific Implications of Retinix Image Processing, SPIE International Symposium on AeroSense, Proceedings of the Conference on Visual Information Processing X, Apr. 2001, 13 pages.

N. Halyo, Z. Rahman, and S. K. Park, Information Content in Nonlinear Local Normalization Processing of Digital Images, SPIE International Symposium on AeroSense, Proceedings of the Conference on Visual Information Processing X, Apr. 2001, 14 pages.

B. Thompson, Z. Rahman, and S. Park, A Multiscale Retinex for Improved Performance In Multispectral Image Classification, SPIE International Symposium on AeroSense, *Visual Information Processing IX*, Apr. 2000, 11 pages.

B. Thompson, Z. Rahman, and S. Park, Retinex Preprocessing for Improved Multi-spectral Image Classification, SPIE International Symposium on AeroSense, *Visual Information Processing VIII*, Apr. 1999, 11 pages.

Z. Rahman, D. J. Jobson, and G. A. Woodell, Resiliency of the Multiscale Retinex Image Enhancement Algorithm, Proceedings of the IS&T Sixth Annual Color Conference, Nov. 1998, 6 pages.

Z. Rahman, G. A. Woodell, and D. J. Jobson, A Comparison of the Multiscale Retinex With Other Image Enhancement Techniques, Proceedings of the IS&T 50th Anniversary Conferenece, May 1997, 6 pages.

Z. Rahman, D. J. Jobson, and G. A. Woodell, A Multiscale Retinex for Color Rendition and Dynamic Range Compression, SPIE International Symposium on Optical Science, Engineering, and Instrumentation, *Conference on Signal and Image Processing*, 9 pages, 1996.

D. J. Jobson, Z. Rahman, and G. A. Woodell, Retinex Image Processing: Improved Fidelity to Direct Visual Observation, Proceedings of the IS&T Fourth Color Imaging Conference: Color Science, Systems, and Applications, (1996), 4 pages.

Z. Rahman, D. J. Jobson, and G. A. Woodell, Multi-scale Retinex for Color Image Enhancement, International Conference on Image Processing (ICIP) '96, 4 pages.

Z. Rahman, Properties of a Center/Surround Retinex: Part 1—Signal Processing Design, NASA Contractor Report 198194, Aug. 1995, 14 pages.

D. J. Jobson and G. A. Woodell, Properties of a Center/Surround Retinex: Part 2—Surround Design, NASA Technical Memorandum 110188, Aug. 1995, 14 pages.

Z. Rahman, D. J. Jobson, and G. A. Woodell, Retinex processing for automatic image enhancement, *Journal of Electronic Imaging*, Jan. 2004, pp. 100-110.

D. J. Jobson, Z. Rahman, and G. A. Woodell, A Multiscale Retinex for Bridging the Gap Between Color Images and the Human Observation of Scenes,*IEEE Transactions on Image Processing: Special Issue on Color Processing*, Jul. 1997, pp. 965-976.

D. J. Jobson, Z. Rahman, and G. A. Woodell, Properties and Performance of a Center/Surround Retinex, *IEEE Transactions on Image Processing*, Mar. 1997, pp. 451-462.

Shadow Illuminator home page, http://www.intriguetek.com/, 2004, 2005 by Intrigue Technologies, Inc., 2 pages.

Shadow Illuminator Press Release, http://www.intriguetek.com/PR_101104.htm, Oct. 11, 2004, Intrigue Technologies, Inc., 2 pages.

The National Science Foundation, Press Release, US NSF—News, New Image Sensor will Show what the Eyes See, and a Camera Cannot, http://www.nsf.gov/news/news_summ.jsp?cntn_id=100719&org=NSF&from=news, Jan. 12, 2005, 5 pages.

Shadow Illuminator, Intrigue Plug-ins, https://www.intrigueplugins.com/moreInfo.php?pID=CBB&PHPSESSID=04f8f11a144601b46ba01532337ce85d, 2004, 2005, Intrigue Technologies, Inc., 5 pages.

Shadow Illuminator Plug-in User Manual Version 2.0, http://www.intrigueplugins.com/SI-User-Manual.pdf, 2004-2005 by Intrigue Technologies, Inc., 12 pages.

Shadow Illuminator Home User Manual Version 1.0, https://www.intrigueplugins.com/SI_Home-User-Manual.pdf, 2004-2005 by Intrigue Technologies, Inc., 12 pages.

Adobe Photoshop Elements 4.0, http://www.adobe.com/products/photoshopelwin/main.html, 2005 Adobe Systems Incorporated, 5 pages.

Adobe Photoshop Elements 4.0, Top new features, http://www.adobe.com/products/photoshopelwin/newfeatures.html, 2005 Adobe Systems incorporated, 5 pages.

Adobe Photoshop Elements 4.0, Product overview, http://www.adobe.com/products/photoshopelwin/pdfs/photoshopelwin_overview.pdf, 2005 Adobe Systems Incorporated, 6 pages.

Adobe Photoshop Creative Suite 2, http://www.adobe.com/products/photoshop/main.html, 2005 Adobe Systems Incorporated, 2 pages.

Adobe Photoshop Creative Suite 2, Top new features, http://www.adobe.com/products/photoshop/newfeatures.html, 2005 Adobe Systems Incorporated, 3 pages.

Adobe Photoshop CS2, At A Glance, http://www.adobe.com/products/photoshop/pdfs/PSCS2_aag.pdf, 2005 Adobe Systems Incorporated, 2 pages.

Adobe Photoshop CS2, What's New in Adobe Photoshop CS2, http://www.adobe.com/products/photoshop/pdfs/pscs2_wn.pdf, 2005 Adobe Systems Incorporated, 7 pages.

Stoik PictureMan 5.0.2 PRO main page, http://www.stoik.com/pictureman/pm40_main.htm, downloaded Oct. 28, 2005, 4 pages.

Stoik PictureMan 5.0 PRO, Shadow/Highlight tool, http://www.stoik.com/pictureman/tool_shadow-highlight.htm, 2005, STOIK Imaging, 4 pages.

Stoik PictureMan 5.0 PRO, Complete image processing in 48 bit color, http://www.stoik.com/pictureman/PictureMan_50.htm, STOIK Imaging, downloaded Oct. 28, 2005, 7 pages.

Picasa Picture Simplicity from Google, home page, http://picasa.google.com/index.html, 2005 Google, Inc., 2 pages.

Picasa Picture Simplicity from Google, Edit Features, http://picasa.google.com/features/features-edit.html, 2005 Google, Inc., 2 pages.

Athentech Imaging, Perfectly Clear for Photography, http://www.athentech.com/home.html, downloaded Oct. 28, 2005, 2 pages.

Athentech Imaging, Applications: Software, http://www.athentech.com/software.html, downloaded Oct. 28, 2005, 2 pages.

Athentech Imaging, How It Works: Overview, http://www.athentech.com/overview.html, downloaded Oct. 28, 2005, 4 pages.

Athentech Imaging, How It Works: Science, http://www.athentech.com/details.html, downloaded Oct. 28, 2005, 10 pages.

Athentech Imaging, How It Works: Implementation, http://www.athentech.com/science.html, downloaded Oct. 28, 2005, 2 pages.

* cited by examiner

IMAGE CONTRAST ENHANCEMENT

COMPUTER PROGRAM LISTING

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

FIELD OF THE INVENTION

The present invention relates to the field of digital image processing, and more particularly to enhancement of digital images.

BACKGROUND OF THE INVENTION

Digital image enhancement concerns applying operations to a digital image in order to improve a picture, or restore an original that has been degraded. Digital image enhancement dates back to the origins of digital image processing. Unlike film-based images, digital images can be edited interactively at will, and detail that is indiscernible in an original image can be brought out. Often images that appear too dark because of poor illumination or too bright because of over illumination can be restored to accurately reflect the original scene.

Enhancement techniques involve digital image processing and can include inter alia filtering, morphology, composition of layers and random variables. Conventional image processing software often includes a wide variety of familiar editing tools used for enhancing an image, such as edge sharpening, smoothing, blurring, histogram equalization, gamma correction, dithering, color palate selection, paint brush effects and texture rendering. Generally, enhancement techniques include one or more parameters, which a user can dynamically adjust to fine-tune the enhanced image.

Several factors distinguish one enhancement technique over another, including inter alia (i) visual quality of the enhanced image, (ii) robustness, (iii) speed and (iv) ease of use. Requirements (ii) and (iv) generally conflict, since the ability to enhance a variety of different types of imagery generally requires a large number of complex adjustable parameters, where ease of use requires a small number of simple adjustable parameters, each of which is intuitive in its effect on the enhanced image. Regarding requirement (iii), for interactive image editing applications, wherein a user repeatedly adjusts enhancement parameters and watches as the enhanced image changes, if the enhancement operation takes more than a fraction of a second to complete, the performance becomes sluggish, and the capability of accurately fine-tuning the enhancement as desired deteriorates. This speed requirement, together with the proliferation of megapixel color images, makes design of an enhancement algorithm quite challenging.

Contrast enhancement is a particular aspect of image enhancement that concerns color variations that are not clearly discernible within an image, because of dark shadows or bright highlights. Because of the eye's relative insensitivity to variations in dark colors and variations in bright colors, important details within an image can be missed. Conventional contrast enhancement can involve transfer functions for expanding dynamic range in some parts of the color spectrum and compressing dynamic range in other parts, and gamma correction for adjusting brightness and contrast.

U.S. Pat. Nos. 6,633,684 and 6,677,959 to James describe contrast enhancement by fitting an original source image, such as an x-ray, between upper and lower low frequency images, and expanding the dynamic color range locally to an interval of color values between the lower and upper frequency image color values. Such expansion serves to visually amplify subtle variations in color value between the lower and upper frequency image color values.

SUMMARY OF THE DESCRIPTION

The present invention concerns a novel method and system for image enhancement that uses one or more filtered images to generate offsets and multipliers for adjusting pixel color values. The image enhancement can be controlled through adjustable user parameters that perform leveling and contrast adjustment for both shadow portions and highlight portions of an original image. These parameters are intuitive and easy to adjust.

The present invention can be implemented extremely efficiently, so as to achieve real-time performance whereby image enhancement is performed within a fraction of a second immediately upon adjustment of a user parameter, for multi-mega-pixel images captured by today's digital cameras. As such, a user is provided with continuous real-time feedback, which enables extremely accurate fine-tuning of the enhancement. Using the present invention, a user is able to instantly compare an enhanced image with a source image, and compare one enhanced image with another enhanced image.

Experimental results have shown that the present invention is robust, and yields excellent quality results, even for images where most of the detail is obscured in shadows or bright highlights.

Specifically, the present invention generates two response curves, one for shadows and one for highlights, each a function of color value. The values of the response curves are used as multipliers for pixel color values. The response curve for highlights is an exponential curve, and increases monotonically from a value of one, corresponding to a color value of 0, to a value greater than or equal to one, corresponding to a maximum color value. As such, the multiplier for highlights visually amplifies bright color variation. The response curve for shadows is also an exponential curve, and decreases monotonically from a value greater than or equal to one, corresponding to a color value of 0, to a value of one, corresponding to a maximum color value. As such, the multiplier for shadows visually amplifies dark color variation.

In accordance with a preferred embodiment of the present invention, the highlight response curve is derived from a first filtered image and the shadow response curve is derived from a second filtered image. In one embodiment of the present invention, the first filtered image is a filter of an image of minimum source color values and the second filtered image is a filter of an image of maximum source color values. In another embodiment of the present invention, the first and second filtered images are filters of an image of source luminance values.

In addition, the present invention uses an offset curve, which is also a function of color value, to scale dynamic color range to the range of color values greater than or equal to the offset value.

Although U.S. Pat. Nos. 6,633,684 and 6,677,959 to James describe use of upper and lower low frequency images, in distinction to James the present invention generates response curves for use as multipliers, whereas James users the upper and lower low frequency images for local scaling of dynamic range.

There is thus provided in accordance with a preferred embodiment of the present invention a method for contrast enhancement for digital images, including filtering an original image having original color values, to generate a first filtered image, corresponding to bright color values, and a second filtered image corresponding to dark color values, deriving local highlight multipliers by applying a highlight response curve to the first filtered image, the highlight response curve being a function of color value that increases from a response value of one, corresponding to a color value of zero, to a response value greater than one, corresponding to a maximum color value, deriving local shadow multipliers by applying a shadow response curve to the second filtered image, the shadow response curve being a function of color value that decreases from a response value greater than one, corresponding to a color value of zero, to a response value of one, corresponding to a maximum color value, deriving local offset values by applying an offset curve to the first filtered image, and processing the original image, including subtracting the local offset values from the original color values to generate shifted color values, multiplying the shifted color values by the local highlight multipliers, and further multiplying the shifted color values by the local shadow multipliers, thereby generating a contrast-enhanced image from the original image.

There is further provided in accordance with a preferred embodiment of the present invention a system for enhancing contrast of digital images, including a filter processor for filtering an original image having original color values, to generate a first filtered image, corresponding to bright color values, and a second filtered image corresponding to dark color values, and an image enhancer coupled to said filter processor for (i) deriving local highlight multipliers by applying a highlight response curve to the first filtered image, the highlight response curve being a function of color value that increases from a response value of one, corresponding to a color value of zero, to a response value greater than one, corresponding to a maximum color value, (ii) deriving local shadow multipliers by applying a shadow response curve to the second filtered image, the shadow response curve being a function of color value that decreases from a response value greater than one, corresponding to a color value of zero, to a response value of one, corresponding to a maximum color value, (iii) deriving local offset values by applying an offset curve to the first filtered image, (iv) subtracting the local offset values from the original color values to generate shifted color values, (v) multiplying the local shifted color values by the highlight multipliers, and (vi) further multiplying the shifted color values by the local shadow multipliers, thereby generating a contrast-enhanced image from the original image.

There is yet further provided in accordance with a preferred embodiment of the present invention a computer-readable storage medium storing program code for causing a computer to perform the steps of filtering an original image having original color values, to generate a first filtered image, corresponding to bright color values, and a second filtered image corresponding to dark color values, deriving local highlight multipliers by applying a highlight response curve to the first filtered image, the highlight response curve being a function of color value that increases from a response value of one, corresponding to a color value of zero, to a response value greater than one, corresponding to a maximum color value, deriving local shadow multipliers by applying a shadow response curve to the second filtered image, the shadow response curve being a function of color value that decreases from a response value greater than one, corresponding to a color value of zero, to a response value of one, corresponding to a maximum color value, deriving local offset values by applying an offset curve to the first filtered image, and processing the original image, including subtracting the local offset values from the original color values to generate shifted color values, multiplying the shifted color values by the local highlight multipliers, and further multiplying the shifted color values by the local shadow multipliers, thereby generating a contrast-enhanced image from the original image.

There is additionally provided in accordance with a preferred embodiment of the present invention a method for contrast enhancement for digital images, including filtering an original image having original color values, to generate a filtered image corresponding to bright color values, deriving local highlight multipliers by applying a highlight response curve to the filtered image, the highlight response curve being a function of color value that increases from a response value of one, corresponding to a color value of zero, to a response value greater than one, corresponding to a maximum color value, deriving local offset values by applying an offset curve to the filtered image, and processing the original image, including subtracting the local offset values from the original color values to generate shifted color values, and multiplying the shifted color values by the local highlight multipliers.

There is moreover provided in accordance with a preferred embodiment of the present invention a method for contrast enhancement for digital images, including filtering an original image having original color values, to generate a filtered image corresponding to dark color values, deriving local shadow multipliers by applying a shadow response curve to the filtered image, the shadow response curve being a function of color value that decreases from a response value greater than one, corresponding to a color value of zero, to a response value of one, corresponding to a maximum color value, and processing the original image, comprising multiplying the original color values by the local shadow multipliers, thereby generating a contrast-enhanced image from the original image.

There is further provided in accordance with a preferred embodiment of the present invention a system for enhancing contrast of digital images, including a filter processor for filtering an original image having original color values, to generate a filtered image corresponding to bright color values, and an image enhancer coupled to said filter processor for (i) deriving local highlight multipliers by applying a highlight response curve to the filtered image, the highlight response curve being a function of color value that increases from a response value of one, corresponding to a color value of zero, to a response value greater than one, corresponding to a maximum color value, (ii) deriving local offset values by applying an offset curve to the filtered image, (iii) subtracting the local offset values from the original color values to generate shifted color values, and (iv) multiplying the shifted color values by the local highlight multipliers, thereby generating a contrast-enhanced image from the original image.

There is yet further provided in accordance with a preferred embodiment of the present invention a system for enhancing contrast of digital images, including a filter processor for filtering an original image having original color values, to generate a filtered image corresponding to dark color values, and an image enhancer coupled to said filter processor for (i) deriving local shadow multipliers by applying a shadow response curve to the filtered image, the shadow response curve being a function of color value that decreases from a response value greater than one, corresponding to a color value of zero, to a response value of one, corresponding to a maximum color value, and (ii) multiplying the original color values by the local shadow multipliers, thereby generating a contrast-enhanced image from the original image.

There is additionally provided in accordance with a preferred embodiment of the present invention a computer-readable storage medium storing program code for causing a computer to perform the steps of filtering an original image having original color values, to generate a filtered image corresponding to bright color values, deriving local highlight multipliers by applying a highlight response curve to the filtered image, the highlight response curve being a function of color value that increases from a response value of one, corresponding to a color value of zero, to a response value greater than one, corresponding to a maximum color value, deriving local offset values by applying an offset curve to the filtered image, and processing the original image, including subtracting the local offset values from the original color values to generate shifted color values, and multiplying the shifted color values by the local highlight multipliers.

There is moreover provided in accordance with a preferred embodiment of the present invention a computer-readable storage medium storing program code for causing a computer to perform the steps of filtering an original image having original color values, to generate a filtered image corresponding to dark color values, deriving local shadow multipliers by applying a shadow response curve to the filtered image, the shadow response curve being a function of color value that decreases from a response value greater than one, corresponding to a color value of zero, to a response value of one, corresponding to a maximum color value, and processing the original image, comprising multiplying the original color values by the local shadow multipliers, thereby generating a contrast-enhanced image from the original image.

BRIEF DESCRIPTION OF THE DRAWINGS

The present invention will be more fully understood and appreciated from the following detailed description, taken in conjunction with the drawings in which.

LIST OF APPENDICES

Figure 1A:
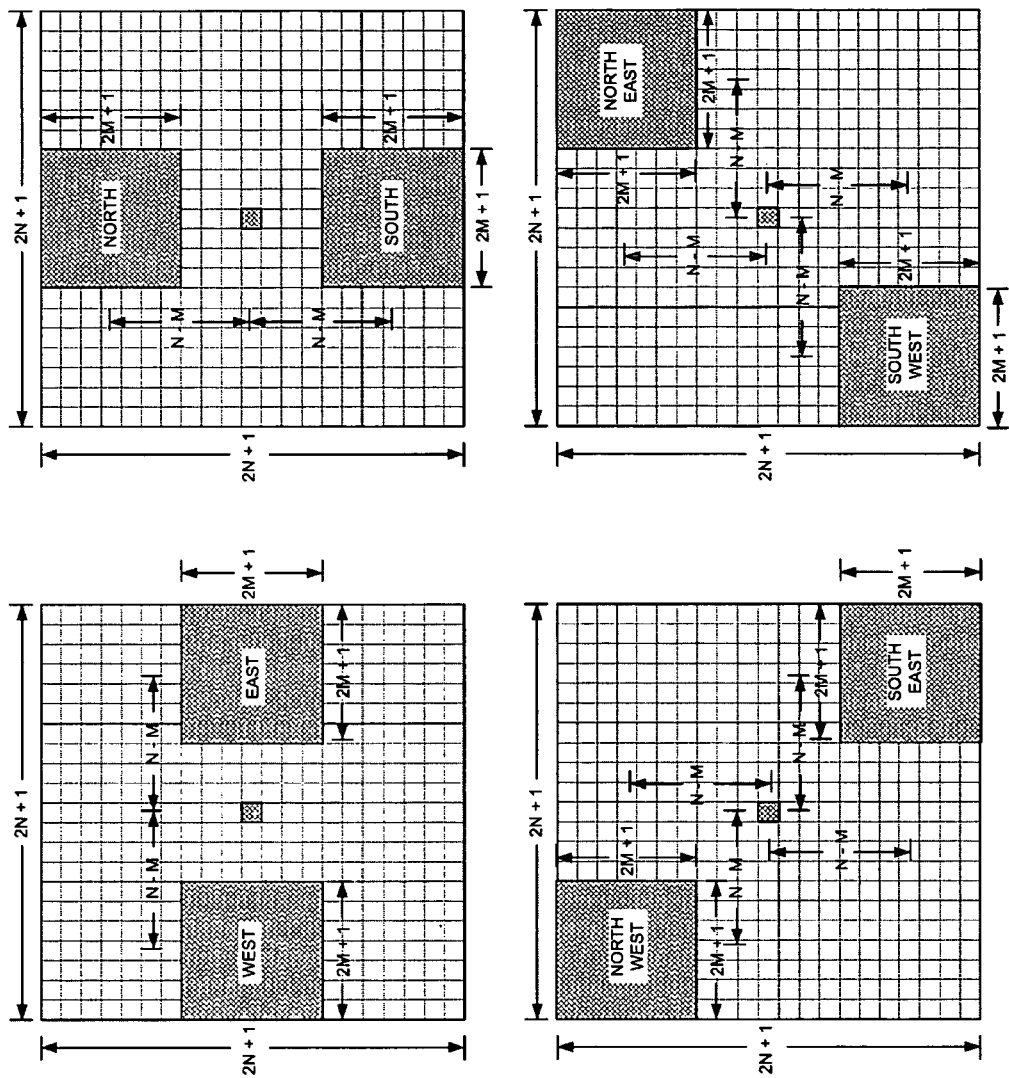
FIG. 1A is an illustration of filter windows and sub-filter windows used in deriving a median filtered image, in accordance with a preferred embodiment of the present invention.

Appendix A is a detailed listing of computer source code written in the C++ programming language for implementing a median or a weighted average filter in accordance with a preferred embodiment of the present invention; and Appendix B is a detailed listing of computer source code written in the C++ programming language for implementing for implementing color enhancement, in accordance with a preferred embodiment of the present invention.

DETAILED DESCRIPTION

The present invention is preferably embodied on a general-purpose consumer-grade computer, including a processor for executing an image-processing software application, a memory for storing program code and for storing one or more digital images, one or more input devices such as a keyboard and a mouse for enabling a user to interact with the software application, a display device, and a bus for intercommunication between these components. Preferably, the computer also includes an interface for receiving digital images from a scanner and from a digital camera, and a network connection for receiving and transmitting digital images over the Internet. The present invention can be embodied in mobile computing devices, in Internet appliances such as electronic picture frames, within vehicles such as airplanes, and within equipment such as medical scanners. The present invention can be implemented in software or in general-purpose or special-purpose hardware, or in a software-hardware combination.

The present invention operates by processing an original source image and deriving a contrast-enhanced image therefrom. The present invention applies to grayscale and color images, with arbitrary color depth. In a preferred embodiment, the present invention includes two phases; namely, a first phase ("Phase One") for deriving one or more filtered images, and a second phase ("Phase Two") for using the one or more filtered images to derive local highlight and shadow multipliers, and local offset values, for each pixel location of the original source image. The enhancement process preferably subtracts the local offset values from color values of the original source image, and multiplies the resulting differences by the local highlight and shadow multipliers.

The highlight and shadow multipliers are preferably derived from highlight and shadow response curves that visually amplify color variation in bright and dark portions of the source image, respectively. The offset values are preferably derived from curves that stretch the contrast of pixels away from the maximum color value.

Preferably, the highlight response curve is an exponential function of color value, of the general form $f(x)=1+k*x^n$, increasing monotonically from a value of one, corresponding to a color value of zero, which is the darkest color value, to a value greater than or equal to one, corresponding to a maximum color value, which is the brightest color value. The variable x is a linearly scaled color value, which ranges from x=0 to x=1 as the color value ranges from zero to its maximum value. Similarly, the shadow response curve is preferably an exponential function of color value, of the general form $f(x)=1+k*(1-x)^n$, decreasing monotonically from a value greater than or equal to one, corresponding to a color value of zero, to a value of one, corresponding to the maximum color value. As such, the highlight response curve, when used as a multiplier, serves to visually amplify color variations for bright colors; and the shadow response curve, when used as a multiplier, serves to visually amplify color valuations for dark colors. Thus careful construction of the highlight and shadow response curves results in high quality contrast enhancement.

In accordance with a preferred embodiment of the present invention, the highlight and shadow response curves are controllable by adjusting values of parameters. These parameters determine the shapes of the highlight and shadow response curves. A user can fine-tune values of these parameters interactively, using a graphical user interface, in order to obtain a satisfactory contrast-enhanced image.

Further in accordance with a preferred embodiment of the present invention, the highlight and shadow multipliers are not obtained by applying the highlight and shadow response curves directly to the source image, respectively, since the benefit of the contrast enhancement to bring out detail in the highlight and shadow areas, would be offset by detailed variation in the multipliers at each pixel location. In order for contrast enhancement to be effective, the highlight and shadow multipliers should be relatively insensitive to local detail variation in the source image.

Instead, the highlight and shadow multipliers are preferably derived by applying the highlight and shadow response curves to corresponding filtered versions of the source image. The filtered versions serve to dampen local detail variation, and thus provide relatively smooth local color values to which the response curves can be applied, and thus a smooth base upon which to derive local highlight and shadow multipliers for the source image.

The present invention can be embodied using a variety of types of filters, such as filters based on medians and filters based on weighted averages, which have been found to be very suitable. Preferably, filter parameters such as window sizes and choice of weights can be adjusted by a user.

Enhancement Algorithm

For purposes of organization, a preferred enhancement algorithm is described in the following description according to Phase One and Phase Two, according to grayscale image enhancement and color image enhancement, and according to type of filters used. Specifically, Phase One is described hereinbelow for two preferred types of filters; a modified median filter, and a modified weighted average filter.

The modified filters used in the present invention differ from the prior art in that sub-window averages of pixel color values are used in place of single pixel color values. I.e., entire sub-windows of pixel values are treated as if they are lumped together and located at single pixel locations. Such modification is better suited for large windows, say, with dimensions on the order of 100 pixels, and yield better representations of local contrast than prior art filters.

1. Phase One

Phase One is also described hereinbelow for grayscale images, which have a single color channel, and color images, which have multiple color channels. Two approaches are described for color image enhancement, a first approach that uses a single filtered image, based on filtering luminance source color values; and a second approach that uses two filtered images, based on filtering minimum and maximum source color values.

1.1 Modified Median Filter

In this embodiment, a modified median filter is applied to a source image, $I_{source}$, to derive a filtered image $I_{filter}$. The median filter used in the preferred embodiment is a hybrid multi-stage median filter, which is a modified version of the finite-impulse response (FIR) median hybrid filter described in Nieminen, A., Heinonen, P. and Neuvo, Y., "A new class of detail-preserving filters for image processing," *IEEE Trans. Pattern Analysis and Machine Intelligence*, Vol. 9, January 1987, and in Arce, G., "Detail-preserving ranked-order based filters for image processing," *IEEE Trans. Acoustics, Speech and Signal Processing*, Vol. 37, No. 1, January 1989. In distinction to the prior art, the present invention uses squares instead of directed lines to construct the sub-filter windows.

An advantage of using squares with median hybrid filters instead of directed lines is that the number of directed lines required to preserve details is large, when using large filter window sizes. The prior art uses 8 sub-filters with a filter of radius 2, and more sub-filters, which use directed lines at additional angles, are generally recommended with filters of larger radii. For the present invention, a filter radius as large as 500 is not uncommon, and thus the prior art would require an enormous number of sub-filters.

Another advantage of using squares with median hybrid filters instead of directed lines, is that the average value computed at each square may be re-used eight times over the course of deriving the median filtered image of the present invention.

Reference is now made to FIG. 1, which is an illustration of filter windows and sub-windows used in deriving a modified median filtered image, in accordance with a preferred embodiment of the present invention. Shown in FIG. 1 is a filter window of dimension (2N+1)×(2N+1) pixels, centered at a pixel (i,j), together with eight sub-windows, each of dimension (2M+1)×(2M+1) pixels. The eight sub-windows are designated "East," "West," "North," "South," "Northwest," "Southeast," "Northeast" and "Southwest," according to their relative positions with respect to pixel (i,j). Thus the center of the West window, for example, is (i−(N−M),j), and its pixel coordinates range from (i−N,j−M) at the lower left corner to (i−N+2M,j+M) at the upper right corner. Here N and M are arbitrary numbers with $0 \leq M \leq N$, and the pixel numbering advances from left to right (first coordinate), bottom to top (second coordinate). In the illustration shown in FIG. 1, N=10 and M=3.

In accordance with a preferred embodiment of the present invention, given a source image, $I_{source}$, for each pixel location (i, j), the averages of $I_{source}$ over each of the sub-windows are computed. The average of $I_{source}$ over the West sub-window; namely, $$\frac{1}{(2M+1)^2} \sum_{i=-M}^{M} \sum_{j=-M}^{M} I_{source}(i-N+M, j), \quad (1)$$

is denoted I-West(i,j), the (i,j) denoting that the West sub-window is positioned westward relative to pixel location (i,j). The other averages are similarly denoted.

When the various averages have been computed, the following seven medians are determined:

med-1(i,j)=median(I-East(i,j),I-West(i,j),$I_{source}$(i,j));  (2a)

med-2(i,j)=median(I-North(i,j),I-South(i,j),$I_{source}$(i,j));  (2b)

med-3(i,j)=median(I-Northwest(i,j),I-Southeast(i,j), $I_{source}$(i,j));  (2c)

med-4(i,j)=median(I-Northeast(i,j),I-Southwest(i,j), $I_{source}$(i,j));  (2d)

med-12(i,j)=median(med-1(i,j),med-2(i,j),$I_{source}$(i,j));  (2e)

med-34(i,j)=median(med-3(i,j),med-4(i,j),$I_{source}$(i,j)); and  (2f)

$I_{filter}$(i,j)=median(med-12(i,j),med-34(i,j),$I_{source}$(i,j)).  (2g)

The median of three numbers is the number in the middle when the three numbers are ordered.

The result of the seventh median calculation in Equation (2g) is the preferred median filter. A way to represent this median filter is to imagine each sub-filter window lumped into a single pixel positioned adjacent to pixel (i, j) according to the relative position of the sub-window, with a pixel value equal to the average value of the source image over the sub-window. This determines a 3×3 pixel window,

| a | b | c |
|---|---|---|
| d | x | e |
| f | g | h | centered at pixel location (i,j), where $x = I_{source}(i,j)$, a=I-Northwest(i,j) and similarly for b through h. Then the value of $I_{filter}(i,j)$ is determined by $$u = \text{median}(\text{median}(d,e,x), \text{median}(b,g,x), x); \tag{3a}$$

$$v = \text{median}(\text{median}(a,h,x), \text{median}(c,f,x), x); \text{ and} \tag{3b}$$

$$I_{filter}(i,j) = \text{median}(u,v,x). \tag{3c}$$

1.1.1 Modified Median Filter—Grayscale Source Image

When the original source image is a grayscale image, with a single color component, then equations (2a)-(2g) directly determine the preferred median filter $I_{filter}$.

1.1.2 Modified Median Filter with Filtered Luminance Image—Color Source Image

For an original source image that is a color image with red, green and blue pixel color components, (R(i,j), G(i,j), B(i,j)), two preferred methods for determining median filtered images are described herein. A first preferred method uses the luminance component of the pixel color values, $L_{source}$, as a source image, and derives a median filtered image, $L_{filter}$, therefrom. The luminance component of a pixel color with color values (R, G, B) is preferably determined by a conventional formula such as L=0.299*R+0.587*G+0.114*B.

1.1.3 Modified Median Filter with Filtered Minimum and Maximum Images—Color Source Image A second preferred method uses two median filtered images, based on the maximum and minimum of the RGB color values. Specifically, denote $MIN_{source}(i,j)$=minimum(R(i,j), G(i,j), B(i,j)) and $MAX_{source}(i/i)$=maximum(R(i,j), G(i,j), B(i,j)). The median filtered image from $MIN_{source}$, denoted $MIN_{filter}$, and the median filtered image from $MAX_{source}$, denoted $MAX_{filter}$, are both used in the second preferred method.

1.2 Modified Weighted Average Filter

It may be appreciated by those skilled in the art that filters other than median filters may be used in Phase One of the present invention. It has been found by experimentation with various types of filters that certain weighted average filters perform well with contrast enhancement, in particular when the filter coefficients generally have an inverse gradient dependency, as described hereinbelow.

As with the modified median filter, the modified weighted average filter operates on an original source image, $I_{source}$, to produce a filtered image, $I_{filter}$. The modified weighted filter is computed using weighted averages of sample values, where the weights corresponding to sample values are constructed as described hereinbelow.

In accordance with a preferred embodiment of the present invention, within a sliding square filter window of width and height 2N+1 centered at pixel location (i,j), square sub-windows, each of width and height 2M+1 are positioned so as to be centered at pixel locations (i+kd, j+ld), for some fixed integer parameter d. It is assumed that M is a divisor of N, i.e., N=Mb, for some integer b; and that the parameter d, which controls the spacing between the sub-windows, is a divisor of N−M, i.e., N−M=nd, for some integer n. The indices k and l above independently range from −n to +n. The average color value over such sub-window, uniformly averaged over the $(2M+1)^2$ pixels within the sub-window, is denoted by $a_{kl}$ and is considered as if it is lumped into a single pixel value.

The filtered value $I_{filter}(i,j)$ is computed as a weighted average of the color value at (i,j), together with the $(2n+1)^2$ sub-window averages $a_{kl}$. For example, with n=2 there are twenty-five sub-window averages, say $a_{-2-2}$, $a_{-2-1}$, ..., as follows:

| $a_{-22}$ | $a_{-12}$ | $a_{02}$ | $a_{12}$ | $a_{22}$ |
|---|---|---|---|---|
| $a_{-21}$ | $a_{-11}$ | $a_{01}$ | $a_{11}$ | $a_{21}$ |
| $a_{-20}$ | $a_{-10}$ | $a_{00}$ | $a_{10}$ | $a_{20}$ |
| $a_{-2-1}$ | $a_{-1-1}$ | $a_{0-1}$ | $a_{1-1}$ | $a_{2-1}$ |
| $a_{-2-2}$ | $a_{-1-2}$ | $a_{0-2}$ | $a_{1-2}$ | $a_{2-2}$ |

Each of the values $a_{kl}$ denotes the average of the pixel color values of $I_{source}$ over a sub-window of size (2M+1)×(2M+1), centered at (i+kd, j+ld). For example, the sub-window corresponding to $a_{-22}$ has its lower left corner at pixel location (i−2d−M, j+2d−M) and its upper right corner at pixel location (i−2d+M, j+2d+M).

Figure 1B:
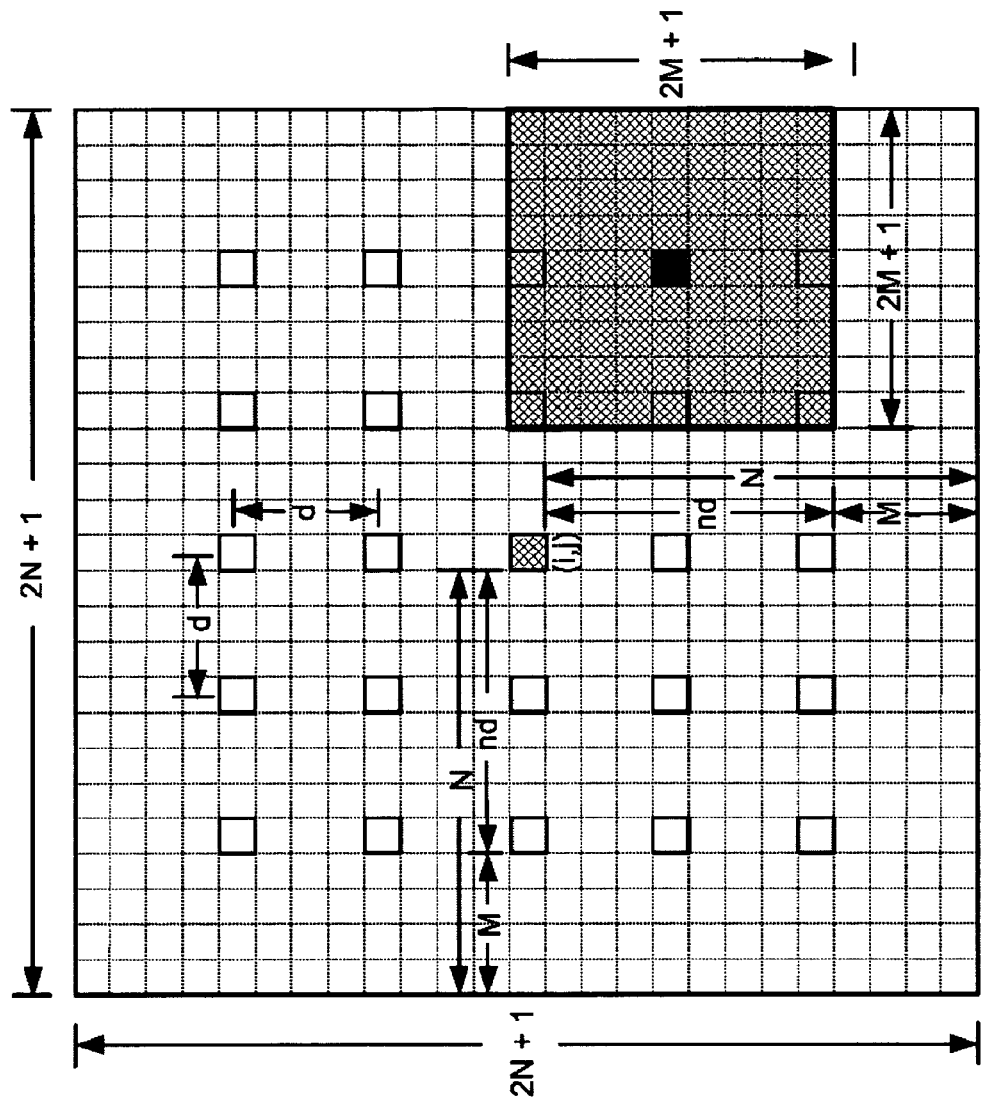
FIG. 1B is an illustration of filter windows and sub-filter windows used in deriving a weighted average filtered image, in accordance with a preferred embodiment of the present invention.

Reference is now made to FIG. 1B, which is an illustration of filter windows and sub-windows used in deriving a modified weighted average filtered image, in accordance with a preferred embodiment of the present invention. Shown in FIG. 1B is a (2N+1)×(2N+1) filter window centered at pixel location (i,j). Also shown are pixel locations with spacings of d between them, vertically and horizontally, centered at pixel location (i,j). The pixel with a solid black fill color, for example, is located at (i+2d, j−d). The sub-window illustrated in FIG. 1B of dimensions (2M+1)×(2M+1), is centered at the solid black pixel. Such sub-windows are positioned at each of the twenty-five pixel locations (i+kd, j+ld) as k and l each range independently from −2 to +2, and the average of the $(2M+1)^2$ color values within each such sub-window is the quantity denoted by $a_{kl}$ hereinabove. The average over the sub-window illustrated in FIG. 1B, for example, is the quantity $a_{2-1}$.

It may be appreciated by those skilled in the art that the sub-window averages $a_{kl}$ may be simple uniform averages, as described above, or non-uniform averages, such as Gaussian blur averages.

The filtered value for pixel location (i,j) is given by a weighted average $$I_{filter} = wI_{source} + \sum_{k=n}^{n}\sum_{l=-n}^{n} w_{kl} a_{kl} \tag{4}$$

where the weights w and $w_{kl}$ are normalized so as to sum to one. In applying Equation (4), the terms $I_{filter}$, $I_{source}$ and the terms $a_{kl}$ in Equation (4) are evaluated at specific pixel locations (i,j); i.e., $I_{filter}(i,j)$, $I_{source}(i,j)$ and $a_{kl}(i,j)$.

It may be appreciated by those skilled in the art that the choice of b and n can be used to provide a trade-off between computational complexity and accuracy in the filtered image. Increasing b and n yields a filtered image with fewer artifacts due to the small sub-window sizes, but increases the computational time. In the limiting case where M=0 and d=1, the modified weighted average in Equation (4) reduces to a conventional weighted average filter.

Various choices for the weights correspond to different types of filters. It is expected that good choices place more weight on sample values that have a value closer to the value of the center pixel. For inverse gradient filters, for example, the weights are chosen so that less weight is placed on averages $a_{kl}$ that differ more from the value of $I_{source}(i,j)$. Four candidate methods for assigning the weights are as follows:

1. Assign w=1, and $w_{kl}$=1 or 0 according to whether Delta is less than Sigma or not, respectively, where Delta=$|I_{source}-a_{kl}|$, and Sigma is a constant.
2. Assign w=1, and $w_{kl}=(1+\text{Delta}/k1)^{-k2}$, where k1 and k2 are constants.
3. Assign w=1, and $w_{kl}=\exp(-\text{Delta}^2/\text{Sigma}^2)$.
4. Assign w=1, and $w_{kl}=\exp(-r^2/k^2-\text{Delta}^2/\text{Sigma}^2)$, where r is the distance between the center pixel (i,j) and the center of the sub-window corresponding to $a_{kl}$, and k is a constant. For computational purposes, r is calculated as the Euclidean pixel distance normalized by the pixel distance between adjacent samples; i.e., r=sqrt$[(i-k)^2+(j-l)^2]$/d. Such normalization by d ensures that the weight coefficients are independent of N.

In each method, 1-4, the weights are preferably re-normalized after being determined as above, by dividing them by their sum, thus ensuring that the normalized weights add up to one. The inverse gradient feature requires that the weights $w_{kl}$ be decreasing or, more precisely, non-increasing, in their dependence on Delta. With method 4 above, the weights are also decreasing in their dependence on the distance, r, of the sub-window $a_{kl}$ from the center pixel (i,j).

Respective references for the weightings in methods 1-4 are:

1. Lee, J.-S., "Digital image smoothing and the Sigma Filter," *Computer Vision, Graphics and Image Processing*, Vol. 24, 1983, pages 255-269.
2. Wang, D. C. C., Vagnucci, A. H. and Li, C. C., "Gradient inverse weighted smoothing scheme and the evaluation of its performance," *Computer Graphics and Image Processing*, Vol. 15, 1981, pages 167-181.
3. Saint-Marc, P., Chen, J. S. and Medioni, G., "Adaptive smoothing: a general tool for early vision," *Proceedings of the Conference on Computer Vision and Pattern Recognition,* 1989, pages 618-624.
4. Smith, S. and Brady, J., "SUSAN—a new approach to low level image processing," *International Journal of Computer Vision*, Vol. 23, No. 1, 1997, pages 45-78.

In distinction from the present invention, reference 2 teaches a different expression for Delta, and does not use the exponent k2 nor the addition of 1 to Delta/k1. Reference 3 teaches a discrete gradient, as computed within a 3×3 window, instead of Delta=$|I_{source}-a_{kl}|$, as above. Additionally, reference 3 teaches a term $2k^2$ in the denominator of the exponential term, instead of Sigma$^2$, as above. Reference 4 above teaches a value of w=0 for the weight at the center pixel (i,j). However, it has been found that, for the present invention, a value of w=1 yields better performance for contrast enhancement.

A particular characteristic of weighted average filters, as opposed to median filters, is that weighted average filters, in general, are primarily sensitive to magnitude of detail in addition to size. Median filters, on the other hand in general, are primarily sensitive only to size. Thus using a weighted average filter, small but very bright, or very dark, features of an image are left intact in the filtered image—which serves to protect such areas from being over-exposed or under-exposed in Phase Two. As such, whereas the parameter N often has to be reduced using a median filter in order to prevent over-exposure or under-exposure in Phase Two, this is generally not required when using a weighted average filter. In fact, using a large value of N tends to be beneficial with weighted average filters, for preserving relative balance of objects in an image. For example, a small value of N tends to eliminate shadows from a face, giving the face an unnatural flat look, whereas a large vale of N preserves the shadows.

2. Phase Two

Phase Two of a preferred of the present invention derives a desired enhanced image, denoted $I_{enhanced}$, from the source image $I_{source}$ and from the filtered images computed in Phase One. Various parameters used in the derivation of $I_{enhanced}$ are user-adjustable, as described hereinbelow. As such, the user can refine the enhanced image by iteratively adjusting these user parameters based on the appearance of the enhanced image.

2. Grayscale Images

For grayscale images, Phase Two proceeds as follows:

$$I_{enhanced} = (I_{source} - g_{offset}) * g_{min} * g_{max}, \quad (5a)$$

where $$g_{min} = 1 + k_{hl}\left(\frac{I_{filter}}{S}\right)^{k_{hc}}, \quad (5b)$$

$$g_{max} = 1 + k_{sl}\left(1 - \frac{I_{filter}}{S}\right)^{k_{sc}}, \quad (5c)$$

$$g_{offset} = S*(1 - 1/g_{min}), \quad (5d)$$

S is the maximum value for a color component (e.g., 255 for 8-bit color channels), and $k_{hl}$, $k_{hc}$, $k_{sl}$ and $k_{sc}$ are user-adjustable parameters. Specifically, $k_{hc}$ is the "highlight contrast" and ranges between 1 and 25;

$k_{hl}$ is the "highlight level" and ranges between 0 and a maximum value determined from $k_{hc}$, as described hereinbelow;

$k_{sc}$ is the "shadows contrast" and ranges between 1 and 25; and $k_{sl}$ is the "shadows level" and ranges between 0 and a maximum value determined from $k_{sc}$, as described hereinbelow.

Preferably, $I_{enhanced}$ is clipped to take values between 0 and S; i.e., $I_{enhanced}$ is set to zero if the value calculated in Equation (5a) is negative, and $I_{enhanced}$ is set to S if the value calculated in Equation (5a) exceeds S.

The choice of $g_{offset}$ is such that color value I=S is a fixed-point of the function (I-$g_{offset}$)*$g_{min}$. Since $g_{min}$ is generally greater than one, this function serves to stretch color values, I, away from S.

In accordance with a preferred embodiment of the present invention, Equations (5a)-(5d) are applied point-wise at each pixel location (i,j) within the enhanced image. I.e., $I_{enhanced}$ in Equation (5a) corresponds to $I_{enhanced}(i,j)$, $I_{source}$ corresponds to $I_{source}(i,j)$ and $I_{filter}$ corresponds to $I_{filter}(i,j)$.

2.2 Color Images

For color images with red, green and blue color components, Phase Two proceeds as follows:

$$C_{enhanced}=(1-k_{CB})*(E-D)+[(1-k_{CB})*D+k_{CB}*E] \\ *g_{min}*g_{max} \quad (6a)$$

where the terms D and E are given by $$D = L_{source} - g_{offset}, \quad (6b)$$

$$E = C_{source} - \{[k_{CB}*L_{source} + (1 - k_{CB})*C_{source}]/L_{source}\}*g_{offset} \quad (6c)$$

$$g_{min} = 1 + k_{hl}\left(\frac{\text{MIN}_{filter}}{S}\right)^{k_{hc}}, \quad (6d)$$

$$g_{max} = 1 + k_{sl}\left(1 - \frac{\text{MAX}_{filter}}{S}\right)^{k_{sc}}, \quad (6e)$$

and where $C_{source}$ is a color component from the source image;
$L_{source}$ is a luminance component from the source image;
$C_{enhanced}$ is the enhanced color component;
$k_{CB}$ is a user-adjustable parameter—the "color boost" parameter, ranging between 0 and 1; and
the parameters $g_{offset}$, $S$, $k_{hl}$, $k_{hc}$, $k_{sl}$ and $k_{sc}$ are as defined hereinabove with respect to Equations (5a)-(5d).

I.e., Equation (6a) represents three equations, for C corresponding to (i) the red color component, (ii) the green color component and (iii) the blue color component.

It is noted that for the special case where $C_{source}=L_{source}$, or for the special case where $k_{CB}=1$, then Equation (6a) reduces to $$C_{enhanced}=(C_{source}-g_{offset})*g_{min}*g_{max},$$

consistent with Equation (5a) hereinabove. As such, the color boost parameter $k_{CB}$ can be considered as a weighting, or mixing factor between $C_{source}$ and $L_{source}$, with no weight on $L_{source}$ when $k_{CB}=1$. It is further noted that for the special case where $k_{CB}=0$, then Equation (6a) reduces to $$C_{enhanced}=(L_{source}-g_{offset})*(g_{min}*g_{max}+C_{source}/L_{source}-1).$$

For example, if $g_{min}=1$ and $g_{max}=2$, then $g_{offset}=0$ and the above expression reduces to $C_{enhanced}=C_{source}+L_{source}$.

Equations (6a)-(6e) correspond to the embodiment of Phase One for color images described hereinabove in Section 1.1.3, in which minimum and maximum images are filtered. In the embodiment of Phase One for color images described hereinabove in Section 1.1.2, in which the luminance image is filtered, both $\text{MIN}_{filter}$ and $\text{MAX}_{filter}$ are replaced by $L_{filter}$ in Equations (6d) and (6e).

As described hereinabove with respect to Equations (5a)-(5d), the enhanced color components $C_{enhanced}$ are preferably clipped so as to range from 0 to S.

It is noted that for color images, Equations (5a)-(5d) are not simply applied independently to each individual color component, since doing so would yield an over-saturated image as a result of the multiplications by $g_{min}$ and $g_{max}$, each of which is greater than one. Instead, Equations (6a)-(6e) include multiplications by $g_{min}$ and $g_{max}$, which serve to increase saturation; and addition of terms $(1-k_{CB})*D$ and $k_{CB}*E$, which serve to reduce saturation.

Implementation Details

In a preferred embodiment of Phase One of the present invention, the various sub-window averages are computed once, and re-used eight times for the modified media filter, and re-used $(2n+1)^2$ times for the weighted average filter. For example, the East average relative to pixel location (i,j) is identical to the West average relative to pixel (i+2*(N−M), j) and to the North average relative to pixel (i+(N−M), j−(N−m)) and to the South average relative to pixel (i+(N−M), j+(N−M)), etc., as can be seen from FIG. 1. Thus it may be appreciated by those skilled in the art that the various sub-window averages may be stored in a sliding window and re-used.

It may further be appreciated that since a square neighborhood average is a separable convolution filter, the two-dimensional summation in Equation (1) reduces to two summations, each over 2M+1 pixel locations; namely, one sum in the vertical direction and the other sum in the horizontal direction. Moreover, a one-dimensional sliding window average is preferably computed by a moving sum. As the window slides one pixel to the right, the new pixel within the window is added into the sum, and the pixel that "slid out of" the window is subtracted.

As a result, the computation of each of the medians in Equations (2a)-(2d) is achieved using only two additions, two subtractions and one division per pixel. The division can be replaced with a look-up table of size $S*(2M+1)^2$, where S is a maximum color value. For 8-bit color channels, S=255.

Reference is now made to Appendix A, which is a detailed listing of computer source code written in the C++ programming language for implementing a median or a weighted average filter in accordance with a preferred embodiment of the present invention. It is noted that the listing Appendix A includes an integer-arithmetic implementation, for faster performance.

In a preferred embodiment of Phase Two of the present invention, computation of $\text{MIN}_{filter}$ and $\text{MAX}_{filter}$ is also performed using a sliding window. It may thus be appreciated that, using the present invention, it is not necessary to store intermediate results in an intermediate buffer of the same dimensions as the source image.

For images having color channels with more than eight bits per color, the present invention preferably down-samples the images to eight bits per color prior to application of the filter. Since, as per Equation (6a) above, the original image is processed at its full dynamic range in Phase Two, the down-sampling of Phase One results in no loss of detail.

Reference is now made to Appendix B, which is a detailed listing of computer source code written in the C++ programming language for implementing for implementing color enhancement, in accordance with a preferred embodiment of the present invention. For computational efficiency, the terms $g_{min}$ and $g_{max}$ are preferably pre-computed for all values of MIN and MAX, and the results are stored in look-up tables. This eliminates the need for re-computing the exponential terms in Equations (6d) and (6e) as the enhanced image pixel color values are being determined.

It is further noted that the parameters $k_{hl}$, $k_{hc}$, $k_{sl}$, $k_{sc}$ and $k_{CB}$ do not impact the filter calculations. As such, the currently saved filtered images can be re-used when a user adjusts these parameters. This eliminates the need for re-applying the filter.

Figure 2:
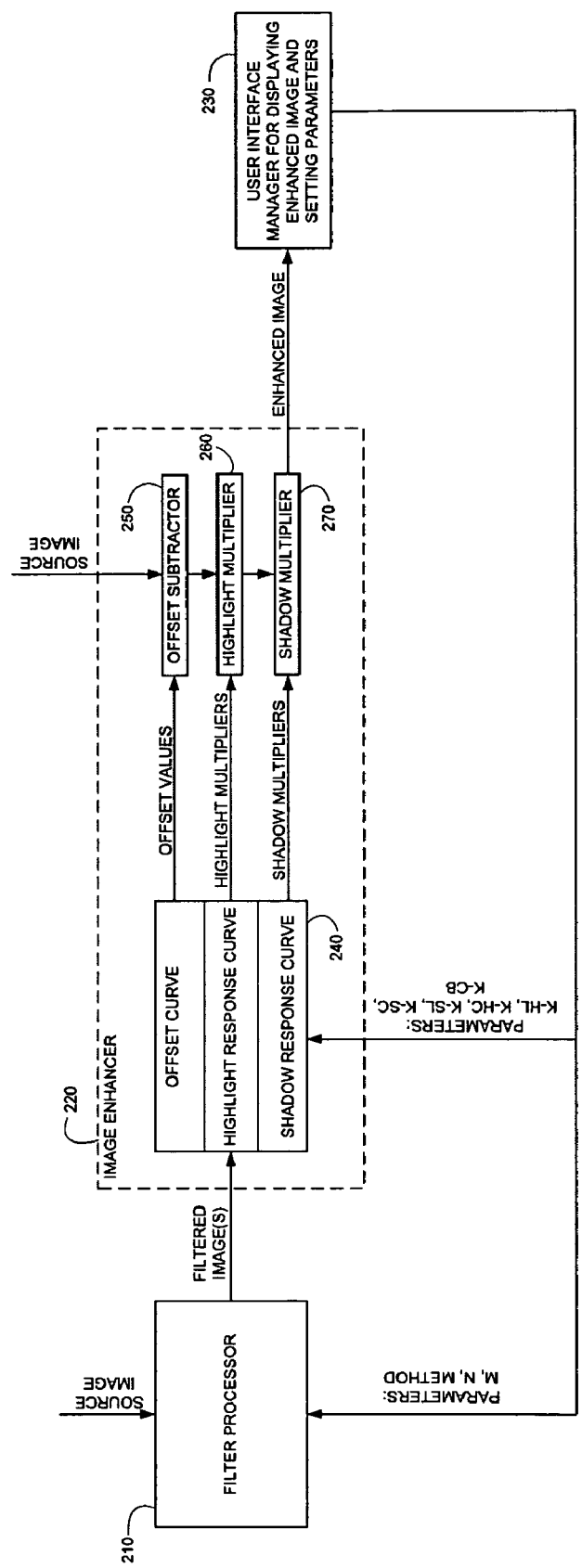
FIG. 2 is a simplified block diagram of the essential components of a system for interactively enhancing digital images, in accordance with a preferred embodiment of the present invention.

Reference is now made to FIG. 2, which is a simplified block diagram of the essential components of a system for interactively enhancing digital images, in accordance with a preferred embodiment of the present invention. As shown in FIG. 2, a source image is processed by a filter processor 210, to derive one or more filtered images. Full details of operation of filter processor 210, in accordance with a preferred embodiment of the present invention, are provided in the computer source code listing in Appendix A.

As described hereinabove, if the source image is a gray-scale image, $I_{source}$, then filter processor 210 preferably derives a filtered image, $I_{filter}$. If the source image is a color image, then filter processor 210 preferably derives, either (i) a filtered luminance image, $L_{filter}$, in accordance with a first preferred embodiment of the present invention, or (ii) two filtered images, $\text{MIN}_{filter}$ and $\text{MAX}_{filter}$, in accordance with a second preferred embodiment. The selection of first or second preferred embodiment is set by a user-adjustable parameter, METHOD.

Filter processor 210 uses window size parameters, M and N, as described hereinabove, which are preferably adjustable by a user.

An image enhancer 220 derives an enhanced image, based on the source image and the one or more filtered images derived by filter processor 210. Image enhancer 220 includes a module 240 for applying an offset curve and highlight and shadow response curves to the filtered images, to obtain offset values and highlight and shadow multipliers, respectively. Specifically, module 240 computes the terms $g_{min}$, $g_{max}$ and $g_{offset}$ from Equations (5b)-(5d). The highlight response curve is of the form $f(x)=1+k(x/S)^n$, where x is a color value ranging between 0 and S, and the highlight multiplier for pixel location (i,j) is obtained by applying the highlight response curve to $I_{filter}(i,j)$, as in Equation (5b). Similarly, the shadow response curve is of the form $f(x)=1+k(1-x/S)^n$, and the shadow multiplier for pixel location (i,j) is obtained by applying the shadow response curve to $I_{filter}(i,j)$, as in Equation (5c). According to Equation (5d), the offset curve is given by $S*[1-1/f(x)]$, where $f(x)$ is the highlight response curve, and the offset value for pixel location (i,j) is obtained by applying the offset curve to $I_{filter}(i,j)$. As the highlight response curve increases from 1 to 1+k, the offset curve increases from 0 to $[k/(k+1)]*S$.

Image enhancer 220 also includes an offset subtractor, 250, for subtracting offset values from source pixel color values, to obtain shifted color values; a highlight multiplier for multiplying the shifted color values by the highlight multipliers; and a shadow multiplier for further multiplying by the shadow multipliers. Together, offset subtractor 250, highlight multiplier 260 and shadow multiplier 270 carry out the operations in Equation (5a).

For purposes of clarification, the operation of image enhancer 220 has been described as it applied to grayscale images, using Equations (5a)-(5d). Similar, but more complex operations are performed when image enhancer 220 is applied to color images, in carrying out Equations (6a)-(6e).

Image enhancer 220 uses parameters $k_{hl}$, $k_{hc}$, $k_{sl}$, $k_{sc}$ and $k_{CB}$, as described hereinabove, which are preferably adjustable by a user. Full details of operation of image enhancer 220, in accordance with a preferred embodiment of the present invention, are provided in the computer source code listing in Appendix B.

After the enhanced image is computed, a user interface manager 230 displays the enhanced image. A user viewing the image can interactively modify values of parameters, and in turn a corresponding modified enhanced image is derived by filter processor 210 and image enhancer 220.

Figure 3:
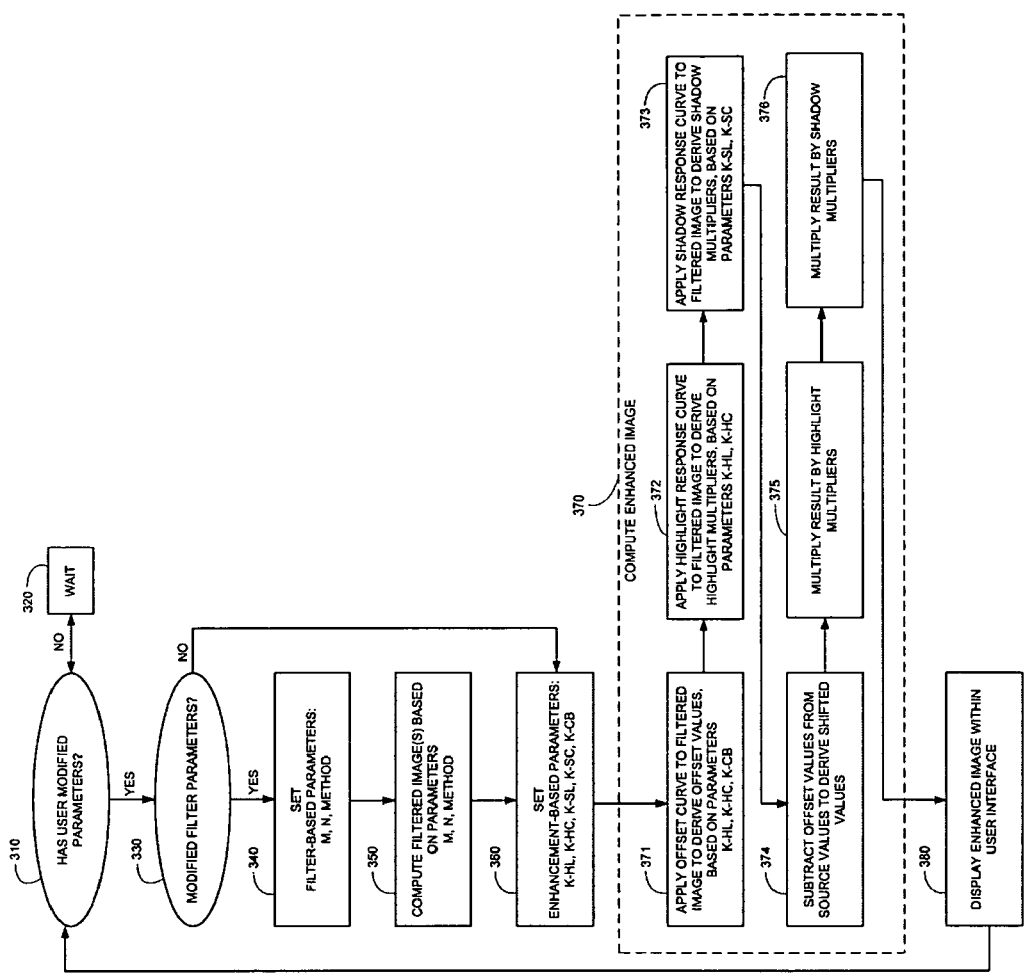
FIG. 3 is a simplified flowchart of the essential steps for interactively enhancing digital images, in accordance with a preferred embodiment of the present invention.

Reference is now made to FIG. 3, which is a simplified flowchart of the essential steps for interactively enhancing digital images, in accordance with a preferred embodiment of the present invention. At step 310 a determination is made as to whether or not a user has adjusted one or more parameter values. If not, then processing waits at step 320 and periodically repeats the determination of step 310. There are two types of parameters; namely, filter-based parameters M, N and METHOD, and enhancement-based parameters $k_{hl}$, $k_{hc}$, $k_{sl}$, $k_{sc}$ and $k_{CB}$, as described hereinabove.

If step 310 determines that one or more parameter values have been adjusted, then at step 330 a further determination is made as to whether or not any of the filter parameters have been adjusted. If so, then at step 340 a user interface sets values of the adjusted filter-based parameters, and at step 350 one or more filtered images are computed. Full details of performance of step 350, in accordance with a preferred embodiment of the present invention, are provided in the computer source code listing in Appendix A.

If step 330 determines that none of the filter parameters have been adjusted, then processing jumps to step 360, where a user interface sets values of the adjusted enhancement-based parameters. At step 370 an enhanced image is computed.

Step 370 preferably includes steps 371-376, which derive offset values and highlight and shadow multipliers, based on $I_{filter}$, as per Equations (5b)-(5d); and apply them to the source image $I_{source}$, as per Equation (5a). As mentioned hereinabove with respect to image enhancer 220 (FIG. 2), the steps shown in FIG. 3 correspond to grayscale image processing. Similar but more complex operations are performed when using Equations (6a)-(6e) for color images. Full details of performance of step 370, in accordance with a preferred embodiment of the present invention, are provided in the computer source code listing in Appendix B.

At step 380 the enhanced image is displayed within a user interface, and a user can interactively adjust parameter values, based on the appearance of the enhanced image. Processing returns to step 310, where the system checks if the user has adjusted parameter values.

Discussion of Experimental Results

Figure 4A:
FIGS. 4A-4F illustrate an image before and after enhancement, an image of overexposed pixel locations for the enhanced image, and various filtered images used in the enhancement process, in accordance with a preferred embodiment of the present invention.

Reference is now made to FIGS. 4A-4F, which illustrate an image before and after enhancement, an image of overexposed pixel locations for the enhanced image, and various filtered images used in the enhancement process, in accordance with a preferred embodiment of the present invention. Shown in FIG. 4A is a user interface display, which is used to view results of image enhancement, and interactively modify enhancement parameters. An original digital image 405, $I_{source}$, is displayed. The original image suffers from poor illumination.

In a right panel of FIG. 4A are displayed various controls that are used to adjust parameters values. Controls 410, 415 and 420 are used to adjust shadow-related parameters. Control 410 is a slider bar for setting a value for the parameter $k_{sl}$, through an intermediate value referred to as "Amount." The value of the "Amount" parameter ranges from 0 to 100, and the value of $k_{sl}$, ranges correspondingly from 0 to its maximum value, as described hereinbelow. The correspondence between $k_{sl}$ and the "Amount" parameter may be linear or non-linear, increasing or decreasing. Control 420 is a slider bar for setting a value for the parameter $k_{sc}$, referred to as "Range." The value of the "Range" parameter ranges from 0 to 100, and the value of $k_{sc}$ ranges correspondingly from 1 to 25. The correspondence between $k_{sc}$ and the "Range" parameter may be linear or non-linear, increasing or decreasing. Control 430 is a slider bar, ranging from 0 to 100, for setting the window size, N, for the filter computation, as described hereinabove.

Controls 425, 430 and 435 are similar to controls 410, 415 and 420, respectively, but are used to adjust highlight-related parameters instead of shadow-related parameters.

Control 440 is used to set the color-boost parameter $k_{CB}$. Control 445, "Color Priority," is used to select either the embodiment described in Section 1.1.2 above, or the embodiment described in Section 1.1.3 above, for performing image enhancement for a color image; i.e., to select between using a filtered luminance image and using filtered minimum and maximum images, as described hereinabove. Control 50 is used to select the type of filter, from among the list:

Median—in accordance with Section 1.1 above;

Sigma—in accordance with method 1 for assigning weights in Section 1.2 above;

Gradient Inverse—in accordance with method 2 for assigning weights in Section 1.2 above;

SMCM—in accordance with method 3 for assigning weights in Section 1.2 above; and SUSAN—in accordance with method 4 for assigning weights in Section 1.2 above As shown in FIG. 4A, the default values of the parameter settings are: Amount=50, Range=60 and Detail=100 for the shadow-related parameters; Amount=0, Range=70 and Detail=100 for the highlight-related parameters; Color Boost=70 and Color Priority is set, indicating the embodiment that uses filtered minimum and maximum images. The default choice of filter is "SMCM." It can be seen from Equations (6d) and (6e) that when the amount parameters are set to zero, so that $k_{sl}=k_{hl}=0$, then the value of the range parameters have no effect on the enhancement.

Figure 4B:

Preferably, a user can adjust controls 410-450 and view the corresponding enhanced image interactively. Shown in FIG. 4B is an enhanced image 455, $I_{enhanced}$, having much better illumination and showing details that were not visible in the original image 405, $I_{source}$. As seen in the figure, the user-adjusted values of the parameter settings are: Amount=100, Range=27 and Detail=100 for the shadow-related parameters; Amount=100, Range=40 and Detail=100 for the highlight-related parameters; Color Boost=70 and Color Priority is set, indicating the embodiment that uses filtered minimum and maximum images. The choice of filter is "Gradient Inverse."

Also shown in FIG. 4B is a response curve 460, displaying the product $f(n)=[n-g_{offset}(n)]*g_{min}(n)*g_{max}(n)$, as a function of color values, n, between 0 and S. The response curve is useful for visualizing the effect of the local contrast enhancement on the shadows (low values of n) and on the highlights (high values of n). The highlight factor, $g_{min}(n)$, increases from 1 to $1+k_{hl}$ as n ranges from 0 to S, and the shadows factor, $g_{max}(n)$, decreases from $1+k_{sl}$ to 1, respectively, and the shapes of these curves changes from linear, when the exponents $k_{hc}$ and $k_{sc}$ are zero, to sub-linear when these exponents are positive. As such, the response curve 460 exhibits a shape like that of a cubic function of n. As can be seen from FIG. 4B, the response curve crosses the 45° line, where $f(n)=n$, three times, including $n=0$ and $n=S$ and an intermediate value of n.

Figure 4C:

A control 465, "Exposure Warning," is used to display pixel locations for which pixel color values as determined by Equations (6a)-(6d) were out of range, and had to be clipped to 0 or to S. Shown in FIG. 4C is a visualization of the out of range pixel locations.

Figure 4D:
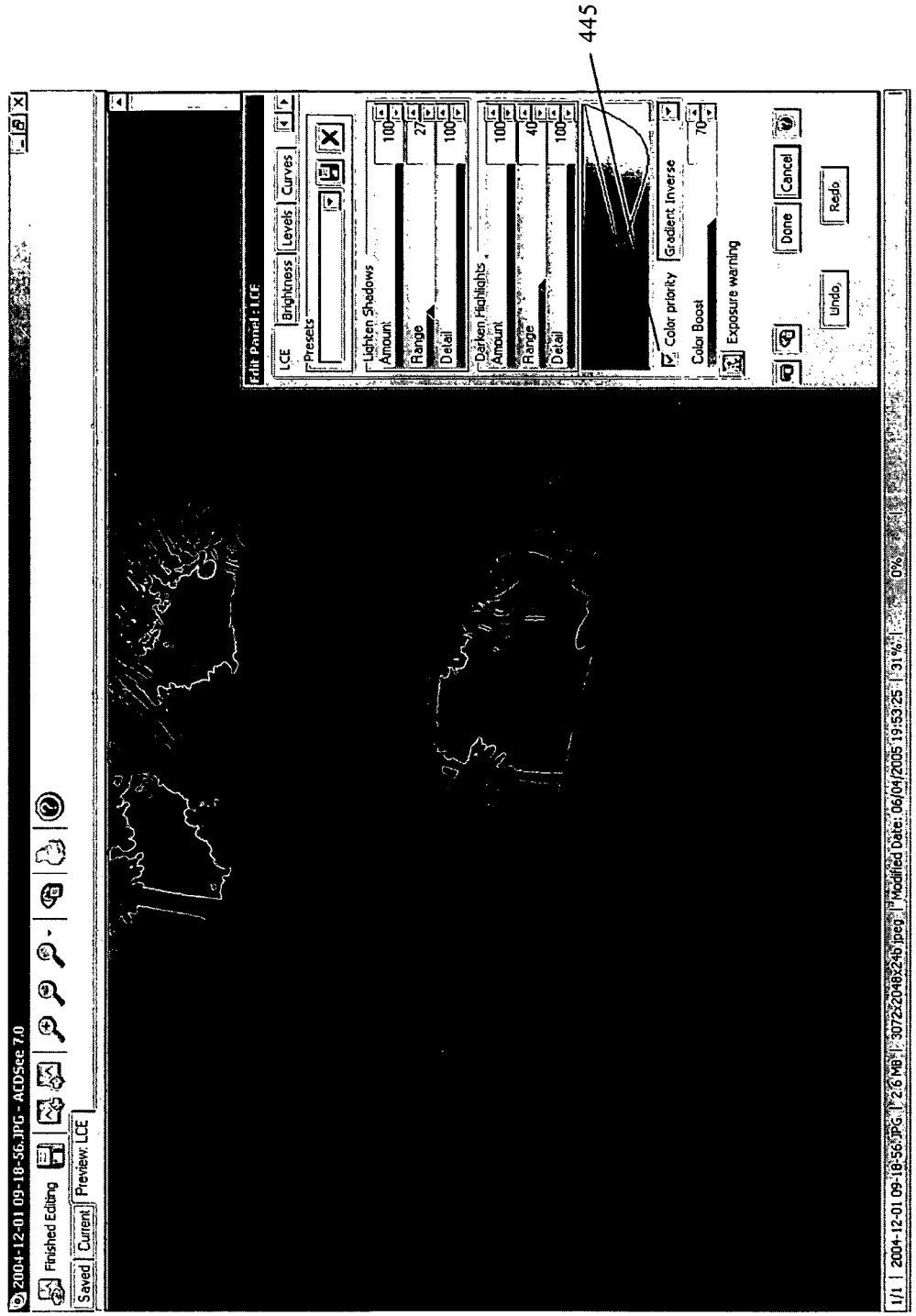
Figure 4E:
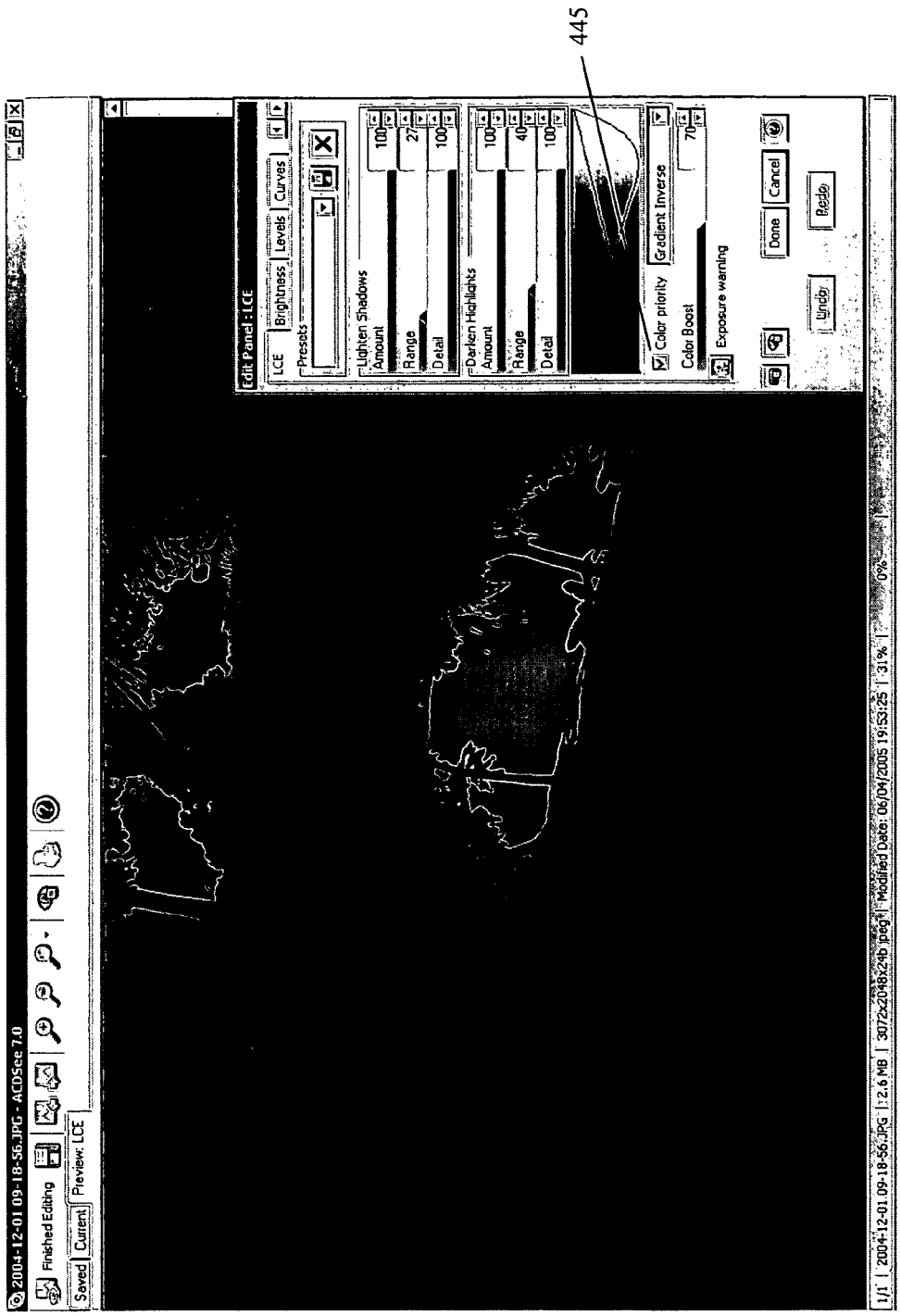
Figure 4F:
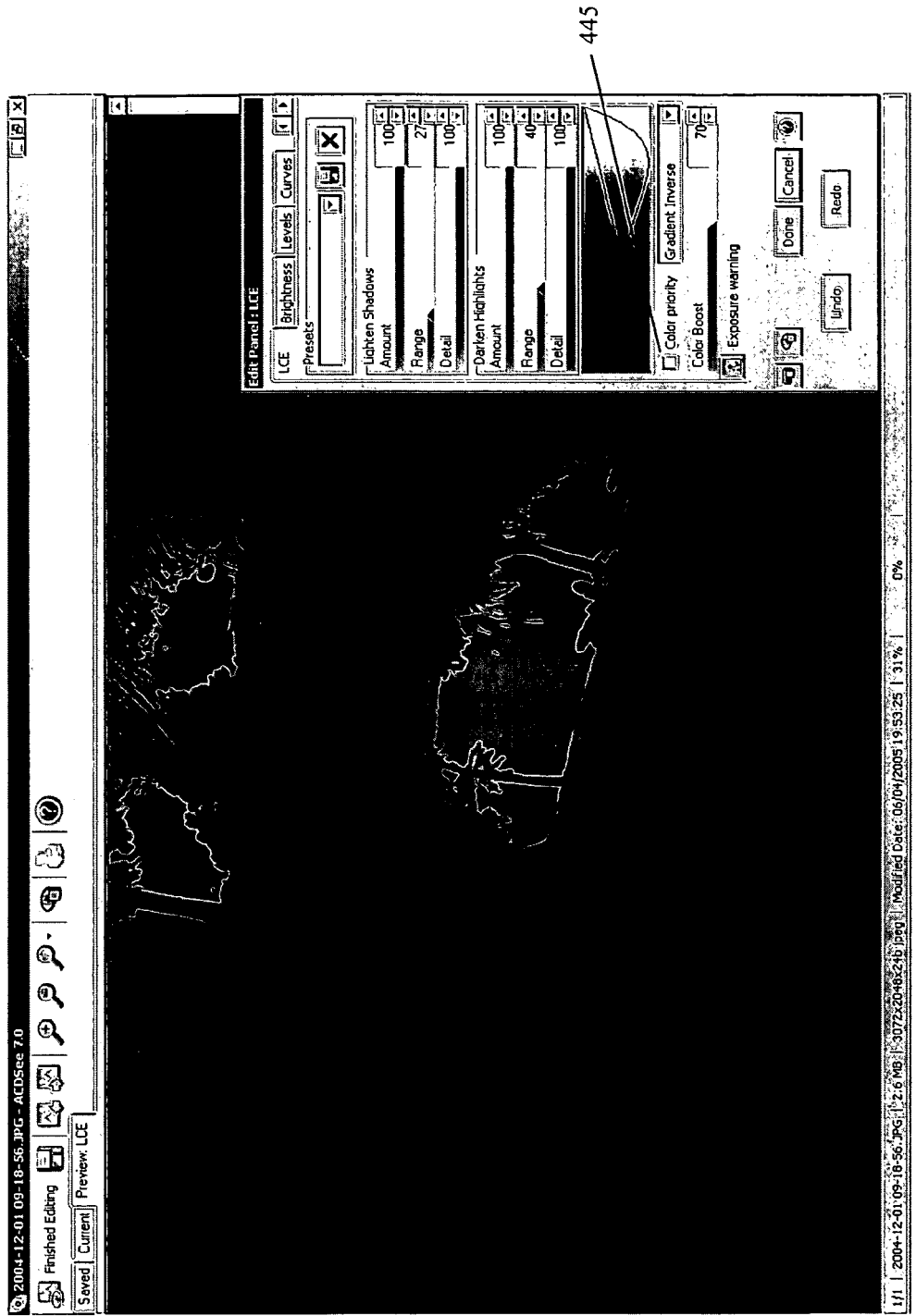

FIGS. 4D and 4E show the filtered minimum and maximum images, $MIN_{filter}$ and $MAX_{filter}$, as described in Section 1.1.3 hereinabove, used in deriving the enhanced image shown in FIG. 4B. FIG. 4F shows the luminance image $L_{filter}$, which is used when following the embodiment described in Section 1.1.2 hereinabove. It is noted that control 445 is checked in FIGS. 4D and 4E, indicating use of the Section 1.1.3 embodiment, and that control 445 is un-checked in FIG. 4F, indicating use of the Section 1.1.2 embodiment.

Studies of results have shown that the present invention suppresses details well in a source image, when such details are smaller than the radius of the filter window. The advantage of suppression of details derives from the use of filtered images to drive enhancement of the source image. The presence of detail in the filtered images suppresses the corresponding detail in the enhancement process, since dark areas are made relatively lighter and light areas are made relatively darker, where "lightness" and "darkness" of an area are determined by the filtered images. In enhancing the image, the present invention stretches contrast of small details, without stretching contrast of large details. This controlled stretching occurs when the filtered images (i) suppress smaller, high-contrast details, by amplitude reduction or blurring; and (ii) leave larger, high-contrast details intact, neither reducing them in amplitude nor blurring them. Blurring of large details in filtered images causes visible "halo" effects in the output image, which is a significant drawback in prior art systems, such as Adobe Photoshop®.

When larger details are present in the source image, the filter may exhibit insensitivity to small detail in transition zones between large bright areas and large dark areas, and such detail passes through the filter without much attenuation. Specifically, the transition zone is an area with width equal to the radius of the filter window and oriented along boundary contours between the dark and light areas.

Through empirical testing it was found that iterative application of the median filter with successively larger values of a filter radius, $r_0, r_1, r_2, \ldots$, serves to resolve the above insensitivity. It was also found that, for large values of window radius, starting with an initial radius $r_0$ less than 10 gives negligible improvement. Thus, in practice, the sequence of radii used is N, N/2, N/4, ..., terminating when a radius, $N/2^{k+1}$, less than 10 is reached. Iterative application of the median filter then proceeds from the smallest radius, $N/2^k$, to the largest radius, N. For example, when the median filter radius is 128, the successive values used for $r_0, r_1, r_2, \ldots$ are 16, 32, 64 and 128.

Similarly, for the weighted average filters, the value of N is increased by a factor of five at each iteration, starting with a minimum value of N=2.

Through empirical testing it was also found that for a given value of N, an optimal value for M is N/2. The parameter N may be user-specified. A default value of N is set to min (width, height)/2, where width and height are the pixel dimensions of the source image, and a user can adjust the value of N to between 0% and 100% of this default value. As such, the filter window can be as large as the entire image. It is noted that this choice for the maximum value of N makes the relative setting of this parameter practically resolution-independent. Thus, the optimal relative setting for N is practically the same, say, for a one mega-pixel image as for a six mega-pixel image.

It has further been found through experimentation, that the enhancement algorithm of the present invention is essentially invariant to scale. Specifically, enhancing, say, a six mega-pixel image and then sub-sampling to a one mega-pixel image produces an image that is nearly identical as the image produces by first sub-sampling and then enhancing. Such invariance to scale is an important advantage of the present invention, since enhancement can be performed on a sub-sampled image used for previewing while a user is adjusting enhancement parameters. When the user then commits the parameters, for example, by clicking on an "Apply" button, the full-resolution image can be enhanced, and the results enhanced image will appear as the user expects.

Through empirical testing, it has been found that the setting b=2 and n=2 in the sub-window configurations for the weighted average filter, represents a good trade-off between computational complexity and accuracy when enhancing typical digital photo resolutions on a typical personal computer.

Regarding choices for the parameters $k_{hl}, k_{hc}, k_{sl}$ and $k_{sc}$, results have shown that a good approach is to let the maximum value of $k_{hl}$ depend on the value of $k_{hc}$, and similarly to let the maximum value of $k_{sl}$ depend on the value of $k_{sc}$. In accordance with a preferred embodiment of the present invention, such maximum values are determined as follows:

1. Determine the largest highlights multiplier for a given value of $k_{hc}$; i.e., the largest value which, when multiplied by any color value, I, gives a product $I*g_{min}(I)$ no smaller than 0. It can be seen from Equation (5b) that such value corresponds to the minimum of $$\left(\frac{I}{256-I}\right) \bigg/ \left(\frac{I}{S}\right)^{k_{sc}},$$

over the range of values for I between 1 and 255. Similarly, determine the largest shadow multiplier for a given value of $k_{sc}$; i.e., the largest value which, when multiplied by any color value, I, gives a product $I*g_{max}(I)$ no larger than 255. It can be seen from Equation (5c) that such value corresponds to the minimum of $$\left(\frac{256}{I}-1\right) \bigg/ \left(1-\frac{I}{S}\right)^{k_{sc}},$$

over the range of values for 1 between 1 and 255.
2. For shadows, use min(256, (I+30)*2.5)) as the maximum value, instead of 255. This adjustment serves to limit the maximum multiplier when the value of $k_{sc}$ is low. For example, multiplying a shadow area by a factor of 10 raises the average luminance of such area to 200, which is still within the dynamic range, but yields poor results due to posterization and noise.
3. For shadows case, levels above 200 are not checked. This adjustment serves to allow a certain amount of clipping when $k_{sc}$ is high. Otherwise, the maximum value of $k_{sl}$ may be set so low as to eliminate the effect of contrast enhancement. For example, if $k_{sc}$ is set to 100, then the response curve is flat, and all areas of the image are multiplied by the same multiplier. The subject adjustment enables a user to modify an image to bring out some amount of clipping. Preferably, an analogous adjustment is made for highlights for levels below 50.
4. The user-specified parameter within the graphical user interface is a percentage between 0 and 100, which is multiplied by the largest values of $k_{hl}$ and $k_{sl}$ as determined in steps 1-3 above.

The listing in Appendix B provides sample source code for determination of parameters $k_{hl}$ and $k_{sl}$ in accordance with steps 1-4 above.

Regarding the parameters k1 and k2 used in determining the weights for the Gradient Inverse filter, as described with respect to Method 2 in Section 1.2 above, it has been found that a choice of k1=120 and k2=6 produces good results. Increasing k2 causes the filter to better preserve extreme local values. In general, a higher exponential rolloff rate tends to better preserve local extremes while simultaneously removing low-amplitude texture.

Discussion of Appendices

Figure 5:
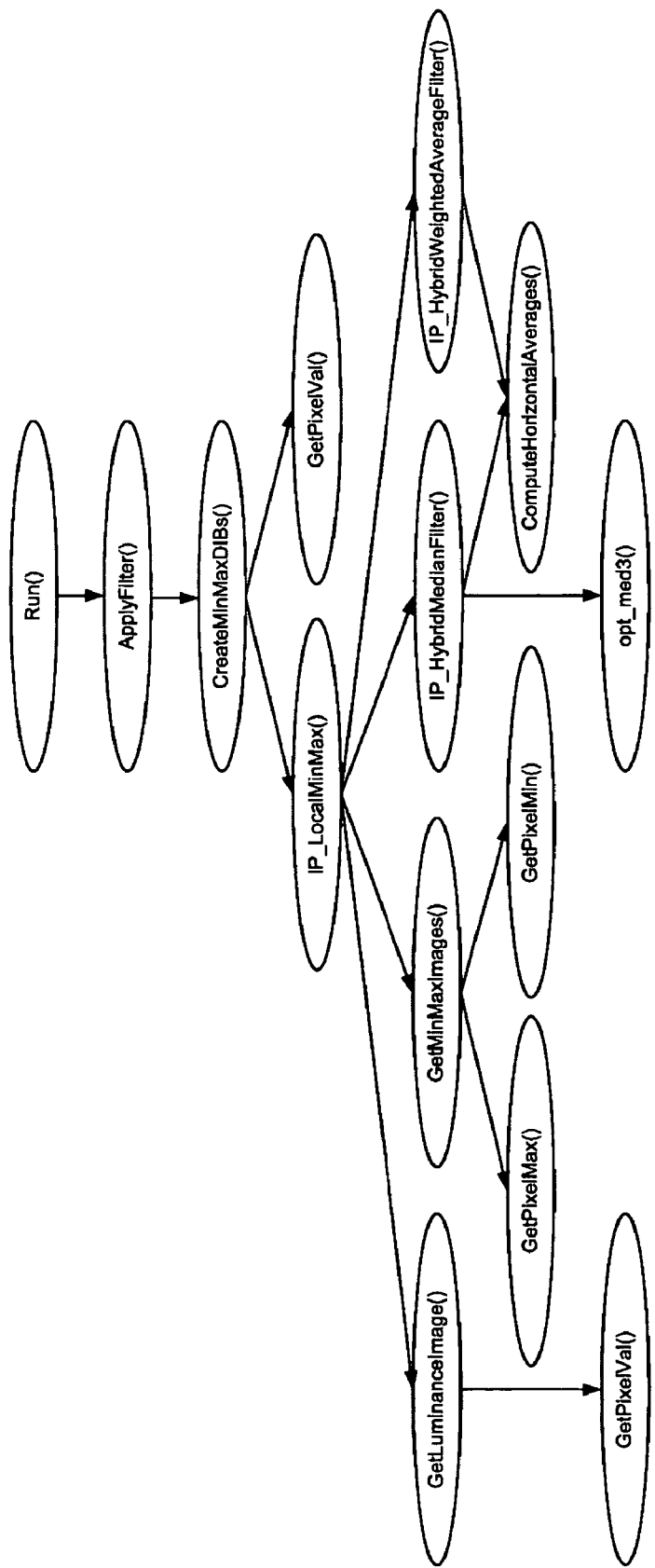
FIG. 5 is a flow diagram of the principal software methods in the source code listed in Appendices A and B, in accordance with a preferred embodiment of the present invention.

Reference is now made to FIG. 5, which is a flow diagram of the principal software methods in the source code listed in Appendices A and B, in accordance with a preferred embodiment of the present invention. The listing in Appendices A and B includes line numbers within methods, for ease of reference.

The main method Run( ), listed in Appendix B, calls ApplyFilter( ) at lines 22-26, which performs local contrast enhancement in accordance with a preferred embodiment of the present invention, and returns a bitmap pDIBDst.

The method ApplyFilter( ), listed in Appendix B, carries out Equations (6a)-(6e) hereinabove. At lines 24 and 25, ApplyFilter calls CreateMinMaxDIBs( ) to generate the filtered image $MIN_{filter}$ and $MAX_{filter}$, which are arrays accessed by member pointers m_pDIBMin and m_pDIB-Max, respectively. The highlight and shadow multipliers $g_{min}$ and $g_{max}$ are tabulated and stored in look-up tables dFacLUTH[ ] and dfacLUTS[ ], respectively. The color boost parameter, $k_{CB}$, is stored in the variable dCBColor. Lines 141-171 correspond to Equations (6a)-(6c) for 24-bit color images. Other code sections in ApplyFilter( ) correspond to 8-bit, 16-bit and 64-bit color images.

The method CreateMinMaxDIBs( ), listed in Appendix B, calls IP_LocalMinMax( ) at lines 65-67, which is the main method used to generate the filtered images $MIN_{filter}$ and $MAX_{filter}$, in accordance with a preferred embodiment of the present invention. CreateMinMaxDIBs( ) also generates the source luminance image, $L_{source}$, by calling GetPixelVal( ) at line 27 and at line 47. $L_{source}$ is an array accessed by a member pointer m_pDIBY.

The method IP_LocalMinMax( ), listed in Appendix A, generates the filtered images $MIN_{filter}$ and $MAX_{filter}$, and stored the results in arrays accessed by pointers pBitsMin and pBitsMax, respectively. The parameter pColorPriority determines whether to filter the luminance source image, as described in Sec. 1.1.2 hereinabove, or else to filter the maximum and minimum sources images, as described in Sec. 1.1.3 hereinabove. Correspondingly, at lines 50 and 51 GetMinMaxImages( ) is called, and at lines 59 and 60 GetLuminanceImage( ) is called. The parameter iMethod determines whether to use a median filter, as described in Sec. 1.1 hereinabove, or a weighted average filter, as described in Sec. 1.2 hereinabove. Correspondingly, at lines 89 and 90 the method IP_HybridMedianFilter( ) is called, and at lines 92 and 93 the method IP_HybridWeightedAverageFilter( ) is called, for computing $MIN_{filter}$. Similarly, at lines 125 and 126 the method IP_HybridMedianFilter( ) is called, and at lines 128 and 129 the method IP_HybridWeightedAverageFilter( ) is called, for computing $MAX_{filter}$.

The method IP_HybridMedianFilter( ), listed in Appendix A, carries out Equations (2a)-(2g) hereinabove. At lines 52 and 53, the method ComputeHorizontalAverages( ) is called, to compute various sub-window averages, as described hereinbelow, and at lines 84-91 the appropriate averages are stored in arrays pAveWindowWest, pAveWindowEast, etc. The Equations (3a)-(3c) are carried out at lines 101-121 using the method opt_med3( ) to compute the median of three numbers.

The method IP_HybridWeightedAverageFilter( ), listed in Appendix A, carries out Equation (4) hereinabove. The parameter iMethod is used to determine the weights that are used, in accordance with methods 1-4 described hereinabove in Sec. 1.2, as can be seen in lines 53-79. The weights are tabulated in an array pnWeights[ ]. For method 4, the weights are modified at lines 99 and 100, to incorporate the multiplication by $\exp(-r^2/k^2)$. At lines 110 and 111 the method ComputeHorizonalAverages( ) is called, to compute various sub-window averages, as described hereinbelow. The weighted average in Equation (4) is computed at lines 159-166 and lines 183-190.

The method GetMinMaxImages( ), listed in Appendix A, computes the source minimum and maximum images, $MIN_{source}$ and $MAX_{source}$, using the methods GetPixelMin( ) and GetPixelMax( ), respectively. Similarly, the method GetLuminanceImage( ), listed in Appendix B, computes the luminance source image, $L_{source}$, using the method GetPixelVal( ).

The method ComputeHorizontalAverages( ), listed in Appendix A, computers one-dimensional horizontal (2M+1)×1 sub-window averages. These horizontal averages are then averaged vertically at lines 61-76 of method IP_Hybrid-MedianFilter( ) and lines 119-134 of method IP_Hybrid-WeightedAverageFilter( ), to derive the two-dimensional (2M+1)×(2M+1) sub-window averages.

The method CreateResponseCurves( ), listed in Appendix B, computers the response curves corresponding to $g_{min}$ and $g_{max}$. Lines 6-22 correspond to determination of maximum values for $k_{hl}$ and $k_{sl}$, based upon values of $k_{hc}$ and $k_{sc}$, respectively, as described hereinabove.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX A

```
#include "StdAfx.h"
#include "IP_LocalMinMax.h"

inline BYTE GetPixelMin(const BYTE* pPixel)
{
   BYTE bMin = pPixel[0];
   if (pPixel[1] < bMin) bMin = pPixel[1];
   if (pPixel[2] < bMin) bMin = pPixel[2];
   return bMin;
}
inline BYTE GetPixelMin(const WORD* pPixel)
{
   WORD wMin = pPixel[0];
   if (pPixel[1] < wMin) wMin = pPixel[1];
   if (pPixel[2] < wMin) wMin = pPixel[2];
   return wMin >> 8;
}
inline BYTE GetPixelMax(const BYTE* pPixel)
{
   BYTE bMax = pPixel[0];
   if (pPixel[1] > bMax) bMax = pPixel[1];
   if (pPixel[2] > bMax) bMax = pPixel[2];
   return bMax;
}
inline BYTE GetPixelMax(const WORD* pPixel)
{
   WORD wMax = pPixel[0];
   if (pPixel[1] > wMax) wMax = pPixel[1];
   if (pPixel[2] > wMax) wMax = pPixel[2];
   return wMax >> 8;
}
{
   return (pPixel[0]*114 + pPixel[1]*587 + pPixel[2]*299 + 500) / 1000;
}
inline BYTE GetPixelVal(const WORD* pPixel)
{
   return (pPixel[0]*299 + pPixel[1]*587 + pPixel[2]*114) / (1000 * 256);
}
inline int BytesPerRow(int w, int bpp)
{
   return ((w * bpp + 31) >> 3) & ~3;
}
#define PIX_SORT(a,b) { if ((a)>(b)) PIX_SWAP((a),(b)); }
define PIX_SWAP(a,b) { BYTE temp=(a);(a)=(b);(b)=temp; } inline BYTE opt_med3(BYTE * p)
{
   PIX_SORT(p[0],p[1]) ; PIX_SORT(p[1],p[2]) ; PIX_SORT(p[0],p[1]);
   return(p[1]) ;
}

1  static void ComputeHorizontalAverages(const BYTE* pSrc, BYTE* pDst, int
2  nCnt, int nRadius, const BYTE* lutAveDiv, BOOL f16BPS)
3  {
4     int nSum = 0;
```

```
5      int nSumCnt = 0;
6      int iDiam = 2*nRadius + 1;
7      int iOut = -iDiam;
8      int iIn  = 0;
9      const BYTE* pSrcIn  = pSrc + iIn;
10     const BYTE* pSrcOut = pSrc + iOut;
11     pDst -= nRadius;
12     if (f16BPS)
13     {
14        pSrcIn++;
15        pSrcOut += iOut + 1;
16     }
17     for (int i=-nRadius ; i<nCnt ; i++)
18     {
19        if (iOut >= 0)
20        {
21           nSum -= *pSrcOut;
22           nSumCnt--;
23        }
24        if (iIn < nCnt)
25        {
26           nSum += *pSrcIn;
27           nSumCnt++;
28        }
29        if (i>=0)
30        {
31           if (nSumCnt == iDiam)
32           {
33              *pDst = lutAveDiv[nSum];
34           }
35           else
36           {
37              *pDst = nSum / nSumCnt;
38           }
39        }
40        iIn++;
41        iOut++;
42        pSrcOut++;
43        pSrcIn++;
44        if (f16BPS)
45        {
46           pSrcIn++;
47           pSrcOut++;
48        }
49        pDst++;
50     }
51  }

1   BOOL IP_HybridMedianFilter(
2       const BITMAPINFO* pBMISrc,
3       const void*       pBitsSrc,
4       void*             pBitsDst,
5       int               iWinRadius,
6       IP_CallbackFN     pCBFunc,
7       void*             pCBParam)
8   {
9       SIZE si = { pBMISrc->bmiHeader.biWidth, pBMISrc->bmiHeader.biHeight };
```

```
10      int nRowBytesSrc = BytesPerRow(pBMISrc->bmiHeader.biWidth, pBMISrc-
11 >bmiHeader.biBitCount);
12      int nRowBytesDst = BytesPerRow(si.cx, 8);
13      const int iWinHeight   = iWinRadius * 2 + 1;
14      const int iAveRadius   = iWinRadius/2;
15      const int iAveDiam     = 2 * iAveRadius + 1;
16      const int iAveWinHeight = iWinHeight - 2*iAveRadius;
17      const int iRadiusDelta = iWinRadius - iAveRadius;
18      BYTE*  lutAveDiv   = new BYTE[iAveDiam*256];
19      const int iAveDiam2 = (iAveDiam+1) / 2;
20      const int iMaxSum = iAveDiam * 256;
21      for (int i=0 ; i<iAveDiam*256 ; i++)
22      {
23          lutAveDiv[i] = min(255, (i + iAveDiam2) / iAveDiam);
24      }
25      int* lutWestOffsets = new int[si.cx];
26      int* lutEastOffsets = new int[si.cx];
27      for (int x=0 ; x<si.cx ; x++)
28      {
29          lutWestOffsets[x] = (x > iRadiusDelta)            ? x : iRadiusDelta;
30          lutEastOffsets[x] = (x < (si.cx-1-iRadiusDelta)) ? x : si.cx - 1 -
31 iRadiusDelta;
32      }
33      BYTE** pHorizAveWindow = new BYTE*[iAveDiam];
34      for (int i=0 ; i<iAveDiam ; i++)
35      {
36          pHorizAveWindow[i] = new BYTE[si.cx];
37      }
38      int* pCurRowSums = new int[si.cx];
39      ZeroMemory(pCurRowSums, sizeof(int) * si.cx);
40      BYTE** pAveWindow = new BYTE*[iAveWinHeight];
41      for (int i=0 ; i<iAveWinHeight ; i++)
42      {
43          pAveWindow[i] = new BYTE[si.cx];
44      }
45      int nSumRows = 0;
46      BOOL fRes = TRUE;
47      for (int y=0 ; y<si.cy+iWinRadius ; y++)
48      {
49          if (y < si.cy)
50          {
51              BYTE* pSrc = (BYTE*)pBitsSrc + y * nRowBytesSrc;
52              ComputeHorizontalAverages(pSrc, pHorizAveWindow[iAveDiam-1],
53 si.cx, iAveRadius, lutAveDiv, (pBMISrc->bmiHeader.biBitCount == 16));
54              BYTE* pHorizAvePtr = pHorizAveWindow[iAveDiam-1];
55              for (x=0 ; x<si.cx ; x++)
56              {
57                  pCurRowSums[x] += *pHorizAvePtr++;
58              }
59              nSumRows++;
60          }
61          if (nSumRows)
62          {
63              BYTE* pAveDst = pAveWindow[iAveWinHeight-1];
64              int* pAveSum = pCurRowSums;
65              for (int x=0 ; x<si.cx ; x++)
66              {
67                  if (nSumRows == iAveDiam)
```

```
 68                {
 69                    *pAveDst++ = lutAveDiv[*pAveSum++];
 70                }
 71                else
 72                {
 73                    *pAveDst++ = *pAveSum++ / nSumRows;
 74                }
 75            }
 76        }
 77        int yOutRow = y - iWinRadius;
 78        if (yOutRow >= 0)
 79        {
 80            BYTE* pSrcRow  = (BYTE*)pBitsSrc + yOutRow * nRowBytesSrc;
 81            BYTE* pDstRow  = (BYTE*)pBitsDst + yOutRow * nRowBytesDst;
 82            int yTop    = max(0, iRadiusDelta-yOutRow);
 83            int yBottom = min(iAveWinHeight-1, si.cy-yOutRow);
 84            BYTE* pAveWindowNorth     = &pAveWindow[yTop      ][0];
 85            BYTE* pAveWindowSouth     = &pAveWindow[yBottom   ][0];
 86            BYTE* pAveWindowWest      = &pAveWindow[iRadiusDelta][-iRadiusDelta];
 87            BYTE* pAveWindowEast      = &pAveWindow[iRadiusDelta][ iRadiusDelta];
 88            BYTE* pAveWindowNorthWest = &pAveWindowNorth[-iRadiusDelta];
 89            BYTE* pAveWindowNorthEast = &pAveWindowNorth[ iRadiusDelta];
 90            BYTE* pAveWindowSouthWest = &pAveWindowSouth[-iRadiusDelta];
 91            BYTE* pAveWindowSouthEast = &pAveWindowSouth[ iRadiusDelta];
 92            BYTE m1[3];
 93            BYTE m2[3];
 94            BYTE m3[3];
 95            for (int x=0 ; x<si.cx ; x++)
 96            {
 97                int wx = lutWestOffsets[x];
 98                int ex = lutEastOffsets[x];
 99                BYTE ctr = (pBMISrc->bmiHeader.biBitCount == 16) ?
100 pSrcRow[(x<<1)+1] : pSrcRow[x];
101                m1[0] = pAveWindowNorth[x];
102                m1[1] = pAveWindowSouth[x];
103                m1[2] = ctr;
104                m2[0] = opt_med3(m1);
105                m1[0] = pAveWindowWest[wx];
106                m1[1] = pAveWindowEast[ex];
107                m1[2] = ctr;
108                m2[1] = opt_med3(m1);
109                m2[2] = ctr;
110                m3[0] = opt_med3(m2);
111                m1[0] = pAveWindowNorthWest[wx];
112                m1[1] = pAveWindowSouthEast[ex];
113                m1[2] = ctr;
114                m2[0] = opt_med3(m1);
115                m1[0] = ctr;
116                m1[1] = pAveWindowNorthEast[ex];
117                m1[2] = pAveWindowSouthWest[wx];
118                m2[1] = opt_med3(m1);
119                m2[2] = ctr;
120                m3[1] = opt_med3(m2);
121                m3[2] = ctr;
122            }
123        }
124        if (y >= iAveDiam-1)
125        {
```

```
126            int* pAveSum = pCurRowSums;
127            BYTE* pAve = pHorizAveWindow[0];
128            for (int x=0 ; x<si.cx ; x++)
129            {
130                *pAveSum++ -= *pAve++;
131            }
132            nSumRows--;
133        }
134        BYTE* pHorizAveWindowTmp = pHorizAveWindow[0];
135        for (int i=1 ; i<iAveDiam ; i++)
136        {
137            pHorizAveWindow[i-1] = pHorizAveWindow[i];
138        }
139        pHorizAveWindow[iAveDiam-1] = pHorizAveWindowTmp;
140        BYTE* pAveWindowTmp = pAveWindow[0];
141        for (int i=1 ; i<iAveWinHeight ; i++)
142        {
143            pAveWindow[i-1] = pAveWindow[i];
144        }
145        pAveWindow[iAveWinHeight-1] = pAveWindowTmp;
146        if (pCBFunc)
147        {
148            if (!pCBFunc(pCBParam, y, si.cy))
149            {
150                fRes = FALSE;
151                break;
152            }
153        }
154    }
155    for (int i=0 ; i<iAveDiam ; i++)
156    {
157        delete[] pHorizAveWindow[i];
158    }
159    for (int i=0 ; i<iAveWinHeight ; i++)
160    {
161        delete[] pAveWindow[i];
162    }
163    delete[] lutAveDiv;
164    delete[] lutWestOffsets;
165    delete[] lutEastOffsets;
166    delete[] pHorizAveWindow;
167    delete[] pCurRowSums;
168    delete[] pAveWindow;
169    return fRes;
170 }

1 BOOL IP_HybridWeightedAverageFilter(
  2     const BITMAPINFO* pBMISrc,
  3     const void*       pBitsSrc,
  4     void*             pBitsDst,
  5     int               iWinRadius,
  6     int               iMethod,
  7     IP_CallbackFN     pCBFunc,
  8     void*             pCBParam)
  9 {
 10     SIZE si = { pBMISrc->bmiHeader.biWidth, pBMISrc->bmiHeader.biHeight };
 11     int nRowBytesSrc = BytesPerRow(pBMISrc->bmiHeader.biWidth, pBMISrc-
 12 >bmiHeader.biBitCount);
```

```
13      int nRowBytesDst = BytesPerRow(si.cx, 8);
14      const int iWinHeight    = iWinRadius * 2 + 1;
15      const int iAveRadius    = iWinRadius / mFac;
16      const int iAveDiam      = 2 * iAveRadius + 1;
17      const int iAveWinHeight = iWinHeight - 2*iAveRadius;
18      const int iRadiusDelta  = iWinRadius - iAveRadius;
19      const int iDeltaStep    = max(1, (2*iRadiusDelta+1)/dFac);
20      const int iNumSteps     = 2 * iRadiusDelta / iDeltaStep + 1;
21      const int iDeltaOffset  = iRadiusDelta % iDeltaStep;
22      BYTE*   lutAveDiv  = new BYTE[iAveDiam*256];
23      const int iAveDiam2 = (iAveDiam+1) / 2;
24      const int iMaxSum = iAveDiam * 256;
25      for (int i=0 ; i<iAveDiam*256 ; i++)
26      {
27         lutAveDiv[i] = min(255, (i + iAveDiam2) / iAveDiam);
28      }
29      BYTE** pHorizAveWindow = new BYTE*[iAveDiam];
30      for (int i=0 ; i<iAveDiam ; i++)
31      {
32         pHorizAveWindow[i] = new BYTE[si.cx];
33      }
34      int* pCurRowSums = new int[si.cx];
35      ZeroMemory(pCurRowSums, sizeof(int) * si.cx);
36      BYTE** pAveWindow = new BYTE*[iAveWinHeight];
37      for (int i=0 ; i<iAveWinHeight ; i++)
38      {
39         pAveWindow[i] = new BYTE[si.cx];
40      }
41      int* pClampX = new int[si.cx + 2*iRadiusDelta+1];
42      int* pLUTClampX = pClampX + iRadiusDelta;
43      for (int x=-iRadiusDelta ; x<=si.cx+iRadiusDelta ; x++)
44         pLUTClampX[x] = min(si.cx-1, max(0, x));
45      int* pLUTClampY = new int[iAveWinHeight];
46      int nSumRows = 0;
47      BOOL fRes = TRUE;
48      UINT anWeights[512];
49      UINT* pnWeights = anWeights+256;
50      const int nWeightShift = 12;
51      const UINT   k = 1 << nWeightShift;
52      const double e = 2.71828182845904523536;
53      for (int i=-256 ; i<256 ; i++)
54      {
55         switch (iMethod)
56         {
57            case IP_LMM_METHOD_SIGMA:
58            {
59               pnWeights[i] = (abs(i) <= nSigma_Sigma);
60               break;
61            }
62            case IP_LMM_METHOD_GIWO:
63            {
64               if (i == 0)
65                  pnWeights[i] = (1<<nWeightShift);
66               else
67                  pnWeights[i] = UINT((1<<nWeightShift) * pow(1.0 +
68   double(abs(i)) / nGIWO_DivFac, -dGIWO_exp));
69               break;
70            }
```

```
 71             case IP_LMM_METHOD_SMCM:
 72             {
 73                 const double  e = dSMCM_e;
 74                 const double t2 = nSMCM_t * nSMCM_t;
 75                 pnWeights[i] = UINT(k * pow(e, -double(i*i) / t2));
 76                 break;
 77             }
 78         }
 79     }
 80     UINT** pnDistWeights = NULL;
 81     if (iMethod == IP_LMM_METHOD_SUSAN)
 82     {
 83         const double  e = dSUSAN_e;
 84         const double s2 = dSUSAN_s * dSUSAN_s;
 85         const double t2 = nSUSAN_t * nSUSAN_t;
 86         pnDistWeights = new UINT*[iNumSteps*iNumSteps];
 87         for (int dy=0 ; dy<iNumSteps ; dy++)
 88         {
 89             for (int dx=0 ; dx<iNumSteps ; dx++)
 90             {
 91                 int idx = dy*iNumSteps + dx;
 92                 pnDistWeights[idx] = new UINT[512];
 93                 int x = iDeltaOffset-iRadiusDelta + (dx * iDeltaStep);
 94                 int y = iDeltaOffset-iRadiusDelta + (dy * iDeltaStep);
 95                 double dDist2 = double(x*x + y*y) /
 96  double(iDeltaStep*iDeltaStep);
 97                 for (int i=-256 ; i<256 ; i++)
 98                 {
 99                     pnDistWeights[idx][i+256] = UINT(k * pow(e, -dDist2 / (2*s2)
100  - double(i*i) / t2));
101                 }
102             }
103         }
104     }
105     for (int y=0 ; y<si.cy+iWinRadius ; y++)
106     {
107         if (y < si.cy)
108         {
109             BYTE* pSrc = (BYTE*)pBitsSrc + y * nRowBytesSrc;
110             ComputeHorizontalAverages(pSrc, pHorizAveWindow[iAveDiam-1],
111  si.cx, iAveRadius, lutAveDiv, (pBMISrc->bmiHeader.biBitCount == 16));
112             BYTE* pHorizAvePtr = pHorizAveWindow[iAveDiam-1];
113             for (x=0 ; x<si.cx ; x++)
114             {
115                 pCurRowSums[x] += *pHorizAvePtr++;
116             }
117             nSumRows++;
118         }
119         if (nSumRows)
120         {
121             BYTE* pAveDst = pAveWindow[iAveWinHeight-1];
122             int* pAveSum = pCurRowSums;
123             for (int x=0 ; x<si.cx ; x++)
124             {
125                 if (nSumRows == iAveDiam)
126                 {
127                     *pAveDst++ = lutAveDiv[*pAveSum++];
128                 }
```

```
129             else
130             {
131                 *pAveDst++ = *pAveSum++ / nSumRows;
132             }
133         }
134     }
135     int yOutRow = y - iWinRadius;
136     if (yOutRow >= 0)
137     {
138         BYTE* pSrcRow  = (BYTE*)pBitsSrc + yOutRow * nRowBytesSrc;
139         BYTE* pDstRow  = (BYTE*)pBitsDst + yOutRow * nRowBytesDst;
140         int y0 = max(0, iRadiusDelta-yOutRow);
141         int y1 = iAveWinHeight-1 + min(0, si.cy-1-yOutRow-iRadiusDelta);
142         for (int iy=0 ; iy<iAveWinHeight ; iy++)
143             pLUTClampY[iy] = max(y0, min(y1, iy));
144         if (iMethod == IP_LMM_METHOD_SUSAN)
145         {
146             for (int x=0 ; x<si.cx ; x++)
147             {
148                 int x0 = x-iRadiusDelta+iDeltaOffset;
149                 int x1 = x+iRadiusDelta;
150                 BYTE ctr = (pBMISrc->bmiHeader.biBitCount == 16) ?
151 pSrcRow[(x<<1)+1] : pSrcRow[x];
152                 UINT uWeightSum = (1 << nWeightShift);
153                 UINT uSum = ctr * uWeightSum;
154                 int wIdx = 0;
155                 for (int iy=iDeltaOffset ; iy<iAveWinHeight ; iy+=iDeltaStep)
156                 {
157                     BYTE* pAve = pAveWindow[pLUTClampY[iy]];
158                     for (int ix=x0 ; ix<=x1 ; ix+=iDeltaStep)
159                     {
160                         UINT uValWin = pAve[pLUTClampX[ix]];
161                         UINT uWeight = pnDistWeights[wIdx++][uValWin-ctr+256];
162                         uWeightSum += uWeight;
163                         uSum += uValWin * uWeight;
164                     }
165                 }
166                 pDstRow[x] = (uSum + (uWeightSum>>1)) / uWeightSum;
167             }
168         }
169         else
170         {
171             for (int x=0 ; x<si.cx ; x++)
172             {
173                 int x0 = x-iRadiusDelta;
174                 int x1 = x+iRadiusDelta;
175                 BYTE ctr = (pBMISrc->bmiHeader.biBitCount == 16) ?
176 pSrcRow[(x<<1)+1] : pSrcRow[x];
177                 UINT uWeightSum = pnWeights[0];
178                 UINT uSum = ctr * uWeightSum;
179                 for (int iy=0 ; iy<iAveWinHeight ; iy+=iDeltaStep)
180                 {
181                     BYTE* pAve = pAveWindow[pLUTClampY[iy]];
182                     for (int ix=x0 ; ix<=x1 ; ix+=iDeltaStep)
183                     {
184                         UINT uValWin = pAve[pLUTClampX[ix]];
185                         UINT uWeight = pnWeights[uValWin - ctr];
186                         uWeightSum += uWeight;
```

```
187                    uSum += uValWin * uWeight;
188                }
189            }
190            pDstRow[x] = (uSum + (uWeightSum>>1)) / uWeightSum;
191        }
192     }
193  }
194  if (y >= iAveDiam-1)
195  {
196      int* pAveSum = pCurRowSums;
197      BYTE* pAve = pHorizAveWindow[0];
198      for (int x=0 ; x<si.cx ; x++)
199      {
200          *pAveSum++ -= *pAve++;
201      }
202      nSumRows--;
203  }
204  BYTE* pHorizAveWindowTmp = pHorizAveWindow[0];
205  for (int i=1 ; i<iAveDiam ; i++)
206  {
207      pHorizAveWindow[i-1] = pHorizAveWindow[i];
208  }
209  pHorizAveWindow[iAveDiam-1] = pHorizAveWindowTmp;
210  BYTE* pAveWindowTmp = pAveWindow[0];
211  for (int i=1 ; i<iAveWinHeight ; i++)
212  {
213      pAveWindow[i-1] = pAveWindow[i];
214  }
215  pAveWindow[iAveWinHeight-1] = pAveWindowTmp;
216  if (pCBFunc)
217  {
218      if (!pCBFunc(pCBParam, y, si.cy))
219      {
220          fRes = FALSE;
221          break;
222      }
223  }
224  }
225  for (int i=0 ; i<iAveDiam ; i++)
226  {
227      delete[] pHorizAveWindow[i];
228  }
229  for (int i=0 ; i<iAveWinHeight ; i++)
230  {
231      delete[] pAveWindow[i];
232  }
233  if (pnDistWeights)
234  {
235      for (int i=0 ; i<iNumSteps*iNumSteps ; i++)
236      {
237          delete[] pnDistWeights[i];
238      }
239      delete[] pnDistWeights;
240  }
241  delete[] lutAveDiv;
242  delete[] pHorizAveWindow;
243  delete[] pCurRowSums;
244  delete[] pAveWindow;
```

```
245         delete[] pClampX;
246         delete[] pLUTClampY;
247         return fRes;
248     }

1     struct ProgressStruct
  2     {
  3         int nPass;
  4         int nPasses;
  5         IP_CallbackFN pCBFunc;
  6         void* pCBParam;
  7     };
  8
  9     BOOL __stdcall MyProgressFunc(void* pParam, int nProgressNum, int nProgressDen)
 10     {
 11         ProgressStruct* ps = (ProgressStruct*)pParam;
 12         int nProgress = ps->nPass * 100 + MulDiv(nProgressNum, 100, nProgressDen);
 13         if (ps->pCBFunc)
 14             return ps->pCBFunc(ps->pCBParam, nProgress, 100*ps->nPasses);
 15         else
 16             return TRUE;
 17     }

1     template <class T>int GetMinMaxImages(const BITMAPINFO* pBMISrc, const T*
  2     pBitsSrc, BYTE* pBitsMin, BYTE* pBitsMax, IP_CallbackFN pCBFunc, void*
  3     pCBParam)
  4     {
  5         UINT cbRowBytesSrc = BytesPerRow(pBMISrc->bmiHeader.biWidth, pBMISrc-
  6     >bmiHeader.biBitCount);
  7         UINT cbRowBytesDst = BytesPerRow(pBMISrc->bmiHeader.biWidth, 8);
  8         int iSamplesPerPixel = (pBMISrc->bmiHeader.biBitCount == 24) ? 3 : 4;
  9         for (int y=0 ; y<pBMISrc->bmiHeader.biHeight ; y++)
 10         {
 11             const T* pSrc = (const T*)((const BYTE*)pBitsSrc + y *
 12     cbRowBytesSrc);
 13             BYTE* pDst1 = pBitsMin + y * cbRowBytesDst;
 14             BYTE* pDst2 = pBitsMax + y * cbRowBytesDst;
 15             for (int x=0 ; x<pBMISrc->bmiHeader.biWidth ; x++)
 16             {
 17                 *pDst1++ = GetPixelMin(pSrc);
 18                 *pDst2++ = GetPixelMax(pSrc);
 19                 pSrc += iSamplesPerPixel;
 20             }
 21             if (!pCBFunc(pCBParam, y, pBMISrc->bmiHeader.biHeight))
 22                 return FALSE;
 23         }
 24         return TRUE;
 25     }

1     int GetMinMaxImages(const BITMAPINFO* pBMISrc, const void* pBitsSrc, void**
  2     ppBitsMin, void** ppBitsMax, IP_CallbackFN pCBFunc, void* pCBParam)
  3     {
  4         UINT cbRowBytesDst = BytesPerRow(pBMISrc->bmiHeader.biWidth, 8);
  5         BYTE* pBitsMin = new BYTE[cbRowBytesDst * pBMISrc->bmiHeader.biHeight];
  6         BYTE* pBitsMax = new BYTE[cbRowBytesDst * pBMISrc->bmiHeader.biHeight];
  7         BOOL fRes = FALSE;
  8         if (pBMISrc->bmiHeader.biBitCount == 64)
```

```
1       fRes = GetMinMaxImages(pBMISrc, (const WORD*)pBitsSrc, pBitsMin,
2    pBitsMax, pCBFunc, pCBParam);
3       else
4          fRes = GetMinMaxImages(pBMISrc, (const BYTE*)pBitsSrc, pBitsMin,
5    pBitsMax, pCBFunc, pCBParam);
6       if (fRes)
7       {
8          *ppBitsMin = pBitsMin;
9          *ppBitsMax = pBitsMax;
10      }
11      else
12      {
13         *ppBitsMin = NULL;
14         *ppBitsMax = NULL;
15         delete[] pBitsMin;
16         delete[] pBitsMax;
17      }
18      return fRes;
19   }
```

```
1    template <class T>int GetLuminanceImage(const BITMAPINFO* pBMISrc, const T*
2    pBitsSrc, BYTE* pBitsY, IP_CallbackFN pCBFunc, void* pCBParam)
3    {
4       UINT cbRowBytesSrc = BytesPerRow(pBMISrc->bmiHeader.biWidth, pBMISrc-
5    >bmiHeader.biBitCount);
6       UINT cbRowBytesDst = BytesPerRow(pBMISrc->bmiHeader.biWidth, 8);
7       int iSamplesPerPixel = (pBMISrc->bmiHeader.biBitCount == 24) ? 3 : 4;
8       for (int y=0 ; y<pBMISrc->bmiHeader.biHeight ; y++)
9       {
10         const T* pSrc = (const T*)((const BYTE*)pBitsSrc + y * cbRowBytesSrc);
11         BYTE* pDst = pBitsY + y * cbRowBytesDst;
12         for (int x=0 ; x<pBMISrc->bmiHeader.biWidth ; x++)
13         {
14            *pDst++ = GetPixelVal(pSrc);
15            pSrc += iSamplesPerPixel;
16         }
17         if (!pCBFunc(pCBParam, y, pBMISrc->bmiHeader.biHeight))
18            return FALSE;
19      }
20      return TRUE;
21   }
```

```
1    int GetLuminanceImage(const BITMAPINFO* pBMISrc, const void* pBitsSrc,
2    void** ppBitsY, IP_CallbackFN pCBFunc, void* pCBParam)
3    {
4       UINT cbRowBytesDst = BytesPerRow(pBMISrc->bmiHeader.biWidth, 8);
5       BYTE* pBitsY = new BYTE[cbRowBytesDst * pBMISrc->bmiHeader.biHeight];
6       BOOL fRes = TRUE;
7       if (pBMISrc->bmiHeader.biBitCount == 64)
8          fRes = GetLuminanceImage(pBMISrc, (const WORD*)pBitsSrc, pBitsY,
9    pCBFunc, pCBParam);
10      else if (pBMISrc->bmiHeader.biBitCount == 24)
11         fRes = GetLuminanceImage(pBMISrc, (const BYTE*)pBitsSrc, pBitsY,
12   pCBFunc, pCBParam);
13      else if (pBMISrc->bmiHeader.biBitCount == 16)
14      {
15         UINT cbRowBytesSrc = BytesPerRow(pBMISrc->bmiHeader.biWidth, pBMISrc-
16   >bmiHeader.biBitCount);
```

```
17          for (int y=0 ; y<pBMISrc->bmiHeader.biHeight && fRes ; y++)
18          {
19              const BYTE* pSrc = ((const BYTE*)pBitsSrc + y * cbRowBytesSrc) + 1;
20              BYTE* pDst = pBitsY + y * cbRowBytesDst;
21              for (int x=0 ; x<pBMISrc->bmiHeader.biWidth ; x++)
22              {
23                  *pDst++ = *pSrc;
24                  pSrc += 2;
25              }
26              fRes = pCBFunc(pCBParam, y, pBMISrc->bmiHeader.biHeight);
27          }
28      }
29      if (fRes)
30      {
31          *ppBitsY = pBitsY;
32      }
33      else
34      {
35          *ppBitsY = NULL;
36          delete[] pBitsY;
37      }
38      return fRes;
39  }

1  BOOL IP_LocalMinMax(
 2      const BITMAPINFO*  pBMISrc,
 3      const void*        pBitsSrc,
 4      void*              pBitsMin,
 5      void*              pBitsMax,
 6      int                iMinRadius,
 7      int                iMaxRadius,
 8      BOOL               bColorPriority,
 9      int                iMethod,
10      IP_CallbackFN      pCBFunc,
11      void*              pCBParam)
12  {
13      SIZE si = { pBMISrc->bmiHeader.biWidth, pBMISrc->bmiHeader.biHeight };
14      int nRowBytes = BytesPerRow(pBMISrc->bmiHeader.biWidth, 8);
15      int iRadiiMin[32];
16      int iRadiiMax[32];
17      int iRadiiMinCnt = 0;
18      int iRadiiMaxCnt = 0;
19      int iRadius = iMinRadius;
20      do
21      {
22          iRadiiMin[iRadiiMinCnt++] = iRadius;
23          iRadius = (iRadius+1) / iDivFac;
24      } while (iRadius >= nMinRadius);
25      if (iMinRadius != iMaxRadius || pBMISrc->bmiHeader.biBitCount >= 24 &&
26  bColorPriority)
27      {
28          iRadius = iMaxRadius;
29          do
30          {
31              iRadiiMax[iRadiiMaxCnt++] = iRadius;
32              iRadius = (iRadius+1) / iDivFac;
33          } while (iRadius >= nMinRadius);
34      }
```

```
35      ProgressStruct ps;
36      ps.nPass = 0;
37      ps.nPasses = iRadiiMinCnt + iRadiiMaxCnt;
38      ps.pCBFunc = pCBFunc;
39      ps.pCBParam = pCBParam;
40      void* pBitsTmp1 = NULL;
41      void* pBitsTmp2 = NULL;
42      const void* pSrc = NULL;
43      void* pDst = NULL;
44      BOOL fRes = TRUE;
45      if (pBMISrc->bmiHeader.biBitCount >= 24)
46      {
47          if (bColorPriority)
48          {
49              ps.nPasses++;
50              fRes = GetMinMaxImages(pBMISrc, pBitsSrc, &pBitsTmp1, &pBitsTmp2,
51  MyProgressFunc, &ps);
52              ps.nPass++;
53              pSrc = pBitsTmp1;
54              pDst = pBitsMin;
55          }
56          else
57          {
58              ps.nPasses++;
59              fRes = GetLuminanceImage(pBMISrc, pBitsSrc, &pBitsTmp1,
60  MyProgressFunc, &ps);
61              ps.nPass++;
62              pSrc = pBitsTmp1;
63              pDst = pBitsMin;
64          }
65      }
66      else
67      {
68          if (pBMISrc->bmiHeader.biBitCount == 16)
69          {
70              ps.nPasses++;
71              fRes = GetLuminanceImage(pBMISrc, pBitsSrc, &pBitsTmp1,
72  MyProgressFunc, &ps);
73              ps.nPass++;
74              pSrc = pBitsTmp1;
75              pDst = pBitsMin;
76          }
77          else
78          {
79              pBitsTmp1 = new BYTE[si.cy * BytesPerRow(si.cx, 8)];
80              pSrc = pBitsSrc;
81              pDst = pBitsMin;
82          }
83      }
84      BITMAPINFO bmi = *pBMISrc;
85      bmi.bmiHeader.biBitCount = 8;
86      while (iRadiiMinCnt-- && fRes)
87      {
88          if (iMethod == IP_LMM_METHOD_MEDIAN)
89              fRes = IP_HybridMedianFilter(&bmi, pSrc, pDst,
90  iRadiiMin[iRadiiMinCnt], MyProgressFunc, &ps);
91          else
```

```
 92              fRes = IP_HybridWeightedAverageFilter(&bmi, pSrc, pDst,
 93     iRadiiMin[iRadiiMinCnt], iMethod, MyProgressFunc, &ps);
 94          ps.nPass++;
 95          if (pDst == pBitsTmp1 || pDst == pBitsMax)
 96          {
 97              pSrc = pDst;
 98              pDst = (BYTE*)pBitsMin;
 99          }
100          else
101          {
102              pSrc = (BYTE*)pBitsMin;
103              pDst = pBitsMax;
104          }
105      }
106      if (fRes)
107      {
108          if (pDst == pBitsMin)
109              CopyMemory(pBitsMin, pBitsMax, si.cy * nRowBytes);
110          if (iRadiiMaxCnt)
111          {
112              if (pBMISrc->bmiHeader.biBitCount >= 24)
113              {
114                  pSrc = bColorPriority ? pBitsTmp2 : pBitsTmp1;
115                  pDst = pBitsMax;
116              }
117              else
118              {
119                  pSrc = (pBMISrc->bmiHeader.biBitCount == 16) ? pBitsTmp1 : pBitsSrc;
120                  pDst = pBitsMax;
121              }
122              while (iRadiiMaxCnt-- && fRes)
123              {
124                  if (iMethod == IP_LMM_METHOD_MEDIAN)
125                      fRes = IP_HybridMedianFilter(&bmi, pSrc, pDst,
126     iRadiiMax[iRadiiMaxCnt], MyProgressFunc, &ps);
127                  else
128                      fRes = IP_HybridWeightedAverageFilter(&bmi, pSrc, pDst,
129     iRadiiMax[iRadiiMaxCnt], iMethod, MyProgressFunc, &ps);
130                  ps.nPass++;
131                  if (pDst == pBitsTmp1)
132                  {
133                      pSrc = pBitsTmp1;
134                      pDst = (BYTE*)pBitsMax;
135                  }
136                  else
137                  {
138                      pSrc = (BYTE*)pBitsMax;
139                      pDst = pBitsTmp1;
140                  }
141              }
142              if (pDst == pBitsMax && fRes)
143                  CopyMemory(pBitsMax, pBitsTmp1, si.cy * nRowBytes);
144          }
145          else
146          {
147              CopyMemory(pBitsMax, pBitsMin, si.cy * nRowBytes);
148          }
149      }
```

```
150    delete[] pBitsTmp1;
151    delete[] pBitsTmp2;
152    return fRes;
153 }
```

APPENDIX B

```
#include "stdafx.h"
#include "LocalContrastEnhancement.h"
#include "IP_LocalMinMax.h"

inline BYTE GetPixelVal(const BYTE* pPixel)
{
    return (pPixel[0]*114 + pPixel[1]*587 + pPixel[2]*299 + 500) / 1000;
}
inline WORD GetPixelVal(const WORD* pPixel)
{
    return (pPixel[0]*114 + pPixel[1]*587 + pPixel[2]*299 + 500) / 1000;
}
```

```
1   CLocalContrastEnhancement::CLocalContrastEnhancement()
2   {
3       m_pDIBMin  = NULL;
4       m_pDIBMax  = NULL;
5       m_pDIBY    = NULL;
6       m_bCacheEnabled = TRUE;
7       m_iCachedRadiusShadows = -9999;
8       m_iCachedRadiusHilites = -9999;
9       m_bCachedColorPriority = TRUE;
10      m_iCachedMethod = -1;
11  }
```

```
1   CLocalContrastEnhancement::~CLocalContrastEnhancement()
2   {
3       delete m_pDIBMin;
4       delete m_pDIBMax;
5       delete m_pDIBY;
6   }
```

```
1   void CLocalContrastEnhancement::EnableCaching(BOOL fEnable)
2   {
3       if(fEnable)
4       {
5           m_bCacheEnabled = TRUE;
6       }
7       else
8       {
9           delete m_pDIBMin;
10          delete m_pDIBMax;
11          delete m_pDIBY;
12          m_pDIBMin  = NULL;
13          m_pDIBMax  = NULL;
14          m_pDIBY = NULL;
15          m_bCacheEnabled = FALSE;
16      }
17  }
```

```
1   DIB* CLocalContrastEnhancement::Run(
2       const DIB* pDIBSrc,
3       const double dFacLUTS[],
4       const double dFacLUTH[],
5       int iRadiusShadows,
```

```
6          int iRadiusHilites,
7          int iColorBoost,
8          BOOL bColorPriority,
9          int iMethod,
10         BOOL bExposureWarning,
11         IP_CallbackFN pCBFunc,
12         void* pCBParam)
13   {
14      m_pDIBSrc = pDIBSrc;
15      DIB* pDIBDst = new DIB(pDIBSrc->Width(), pDIBSrc->Height(), pDIBSrc-
16   >BitsPP(), pDIBSrc->ColormapLen(), pDIBSrc->Colormap(), NULL, (pDIBSrc-
17   >BitsPP()==16));
18      if(!pDIBDst)
19      {
20         return NULL;
21      }
22      if  (ApplyFilter(pDIBDst->bmi, pDIBDst->bits, pDIBSrc->bmi, pDIBSrc-
23   >bits,
24                   dFacLUTS,   dFacLUTH,   iRadiusShadows,   iRadiusHilites,
25   iColorBoost, bColorPriority, iMethod, bExposureWarning,
26                   pCBFunc, pCBParam))
27      {
28         m_pDIBSrc = NULL;
29         return pDIBDst;
30      }
31      else
32      {
33         delete pDIBDst;
34         return NULL;
35      }
36   }
1    BOOL CLocalContrastEnhancement::ApplyFilter(
2                    BITMAPINFO*      pBMIDst,
3                    void*            pBitsDst,
4              const BITMAPINFO*      pBMISrc,
5              const void*            pBitsSrc,
6              const double           dFacLUTS[],
7              const double           dFacLUTH[],
8                    int              iRadiusShadows,
9                    int              iRadiusHilites,
10                   int              iColorBoost,
11                   BOOL             bColorPriority,
12                   int              iMethod,
13                   BOOL             bExposureWarning,
14                   IP_CallbackFN    pCBFunc,
15                   void*            pCBParam)
16   {
17      if (!pBMIDst || !pBitsDst || !pBMISrc || !pBitsSrc)
18         return FALSE;
19      switch (pBMISrc->bmiHeader.biBitCount)
20      {
21         case 8: case 16: case 24: case 64: break;
22         default: return FALSE;
23      }
24      if  (!CreateMinMaxDIBs(iRadiusShadows, iRadiusHilites, bColorPriority,
25   iMethod, pCBFunc, pCBParam))
26      {
```

```
27          return FALSE;
28      }
29      const BITMAPINFOHEADER& bmihSrc = pBMISrc->bmiHeader;
30      const BITMAPINFOHEADER& bmihDst = pBMIDst->bmiHeader;
31      SIZE si = { pBMISrc->bmiHeader.biWidth, pBMISrc->bmiHeader.biHeight };
32      UINT cbRowBytesSrc = BytesPerRow(pBMISrc);
33      UINT cbRowBytesDst = BytesPerRow(pBMIDst);
34      switch (bmihSrc.biBitCount)
35      {
36          case 8: case 16: case 24: case 64:
37              break;
38          default:
39              return FALSE;
40      }
41      if (bmihDst.biBitCount != bmihSrc.biBitCount)
42          return FALSE;
43      if (bmihSrc.biBitCount == 8)
44      {
45          for (int c=0 ; c<256 ; c++)
46          {
47              pBMIDst->bmiColors[c].rgbRed      = c;
48              pBMIDst->bmiColors[c].rgbGreen    = c;
49              pBMIDst->bmiColors[c].rgbBlue     = c;
50              pBMIDst->bmiColors[c].rgbReserved = 0;
51          }
52      }
53      double dScale = double(1 << 12);
54      double dCBColor = double(iColorBoost) / 100.0;
55      double dCBLuma  = 1.0 - dCBColor;
56      int iCBColor = int(dCBColor * dScale + 0.5);
57      int iCBLuma  = int(dCBLuma  * dScale + 0.5);
58      double dOffLUTH[256];
59      double dOffLUTH16[256];
60      double dOffLUTHLum[256];
61      double dOffLUTHClr[256];
62      for (int i=0 ; i<256 ; i++)
63      {
64          dOffLUTH[i]    = 255.5 - (255.0 / dFacLUTH[i]);
65          dOffLUTH16[i]  = 65535.5 - (65535.0 / dFacLUTH[i]);
66          dOffLUTHClr[i] = max(0, (255.5 - (255.0 / dFacLUTH[i]))) * dCBColor;
67          dOffLUTHLum[i] = dOffLUTH[i] - dOffLUTHClr[i];
68      }
69      int iFacLUTH[256];
70      int iFacLUTS[256];
71      int iOffLUTH[256];
72      int iOffLUTHLum[256];
73      int iOffLUTHClr[256];
74      int nFac2Max = 0;
75      for (int i=0 ; i<256 ; i++)
76      {
77          iFacLUTS[i]    = int(dFacLUTS[i] * dScale + 0.5);
78          iFacLUTH[i]    = int(dFacLUTH[i] * dScale + 0.5);
79          iOffLUTH[i]    = int(65535.0 - (65535.0 / dFacLUTH[i]));
80          iOffLUTHClr[i] = max(0, int((65535.0- (65535.0 / dFacLUTH[i])) *
81  dCBColor + 0.5));
82          iOffLUTHLum[i] = iOffLUTH[i] - iOffLUTHClr[i];
83      }
84      BOOL fRes = TRUE;
```

```
85          for (int y=0 ; y<si.cy ; y++)
86          {
87              const BYTE* pSrc   = (const BYTE*)pBitsSrc + y * cbRowBytesSrc;
88              BYTE* pDst         = (BYTE*)pBitsDst       + y * cbRowBytesDst;
89              const BYTE* pMin   = (const BYTE*)m_pDIBMin->bits + y * m_pDIBMin-
90   >BytesPerRow();
91              const BYTE* pMax   = (const BYTE*)m_pDIBMax->bits + y * m_pDIBMax-
92   >BytesPerRow();
93              if (bmihSrc.biBitCount == 8)
94              {
95              for (int x=0 ; x<si.cx ; x++)
96                  {
97                      int nMin = *pMin++;
98                      int nMax = *pMax++;
99                      int     nVal  =    (((*pSrc++    <<    8)   -   iOffLUTH[nMin])   *
100  ((iFacLUTS[nMax] * iFacLUTH[nMin]) >> 12)) >> 20;
101                     if (nVal < 0) nVal = 0; else if (nVal > 255) nVal = 255;
102                     *pDst++ = nVal;
103                 }
104             }
105             else if (bmihSrc.biBitCount == 16)
106             {
107                 const WORD* pSrc16 = (const WORD*)pSrc;
108                 WORD* pDst16       = (WORD*)pDst;
109                 for (int x=0 ; x<si.cx ; x++)
110                 {
111                     int nMin = *pMin++;
112                     int nMax = *pMax++;
113                     int nVal = *pSrc16++ - iOffLUTH[nMin];
114                     int nOut = int(nVal * dFacLUTH[nMin] * dFacLUTS[nMax] + 0.5);
115                     if (nOut < 0) nOut = 0;
116                     else if (nOut > 65535) nOut = 65535;
117                     *pDst16++ = nOut;
118                 }
119             }
120             else if (bmihSrc.biBitCount == 24)
121             {
122                 const BYTE* pY = (const BYTE*)m_pDIBY->bits + y * m_pDIBY-
123  >BytesPerRow();
124                 for (int x=0 ; x<si.cx ; x++)
125                 {
126                     int Y = *pY++    << 8;
127                     int B = *pSrc++  << 8;
128                     int G = *pSrc++  << 8;
129                     int R = *pSrc++  << 8;
130                     int nMin = *pMin++;
131                     int nMax = *pMax++;
132                     UINT uFac = (iFacLUTS[nMax] * iFacLUTH[nMin]) >> 12;
133                     int nOffset = iOffLUTH[nMin];
134                     if (nOffset)
135                     {
136                         int iColorOffset = iOffLUTHClr[nMin];
137                         int iLumaOffset  = iOffLUTHLum[nMin];
138                         int iOffY = max(0, Y - iLumaOffset);
139                         if (Y > 0)
140                         {
141                             B = MulDiv(B, iOffY, Y) - iColorOffset; if (B < 0) B = 0;
142                             G = MulDiv(G, iOffY, Y) - iColorOffset; if (G < 0) G = 0;
```

```
143                    R = MulDiv(R, iOffY, Y) - iColorOffset; if (R < 0) R = 0;
144                    Y = iOffY - iColorOffset;               if (Y < 0) Y = 0;
145                }
146                else
147                {
148                    B = G = R = 0;
149                }
150            }
151            int iOutY = (Y * uFac) >> 12;
152            int iOutB = (B * uFac) >> 12;
153            int iOutG = (G * uFac) >> 12;
154            int iOutR = (R * uFac) >> 12;
155            int iDiffY = iOutY - Y;
156            if (iDiffY)
157            {
158                int iDiffYContrib = (iDiffY * iCBLuma) >> 12;
159                if (iDiffYContrib)
160                {
161                    iOutB = (B + iDiffYContrib + (((iOutB - B) * iCBColor) >> 12));
162                    iOutG = (G + iDiffYContrib + (((iOutG - G) * iCBColor) >> 12));
163                    iOutR = (R + iDiffYContrib + (((iOutR - R) * iCBColor) >> 12));
164                }
165            }
166            if (iOutB < 0) iOutB = 0;   else if (iOutB > 65535) iOutB = 65535;
167            if (iOutG < 0) iOutG = 0;   else if (iOutG > 65535) iOutG = 65535;
168            if (iOutR < 0) iOutR = 0;   else if (iOutR > 65535) iOutR = 65535;
169            *pDst++ = iOutB >> 8;
170            *pDst++ = iOutG >> 8;
171            *pDst++ = iOutR >> 8;
172            if(bExposureWarning)
173            {
174                RGBTRIPLE* pRGBDst = (RGBTRIPLE*)(pDst-3);
175                RGBTRIPLE* pRGBSrc = (RGBTRIPLE*)(pSrc-3);
176                if((pRGBDst->rgbtRed   == 255 && pRGBSrc->rgbtRed   != 255) ||
177                   (pRGBDst->rgbtGreen == 255 && pRGBSrc->rgbtGreen != 255) ||
178                   (pRGBDst->rgbtBlue  == 255 && pRGBSrc->rgbtBlue  != 255))
179                {
180                    pRGBDst->rgbtRed   = 255;
181                    pRGBDst->rgbtGreen = 0;
182                    pRGBDst->rgbtBlue  = 0;
183                }
184                else if((pRGBDst->rgbtRed   == 0 && pRGBSrc->rgbtRed   != 0) ||
185                        (pRGBDst->rgbtGreen == 0 && pRGBSrc->rgbtGreen != 0) ||
186                        (pRGBDst->rgbtBlue  == 0 && pRGBSrc->rgbtBlue  != 0))
187                {
188                    pRGBDst->rgbtRed   = 0;
189                    pRGBDst->rgbtGreen = 255;
190                    pRGBDst->rgbtBlue  = 0;
191                }
192            }
193        }
194    }
195    else if (bmihSrc.biBitCount == 64)
196    {
197        const WORD* pY     = (const WORD*)((const BYTE*)m_pDIBY->bits + y
198 * m_pDIBY->BytesPerRow());
199        const WORD* pSrc16 = (const WORD*)pSrc;
200        WORD* pDst16       = (WORD*)pDst;
```

```
201             for (int x=0 ; x<si.cx ; x++)
202             {
203                int nMin = *pMin++;
204                int nMax = *pMax++;
205                double Y = *pY++;
206                double R = *pSrc16++;
207                double G = *pSrc16++;
208                double B = *pSrc16++;
209                pSrc16++;
210                double sFac = dFacLUTS[nMax];
211                double hFac = dFacLUTH[nMin];
212                double fac = sFac * hFac;
213                int nOffset = iOffLUTH[nMin];
214                if (nOffset)
215                {
216                   double dColorOffset = dOffLUTHClr[nMin] * 256.0;
217                   double dLumaOffset  = dOffLUTHLum[nMin] * 256.0;
218                   double dOffY = max(0.0, Y-dLumaOffset);
219                   B = max(0.0, (Y>0.0 ? B * dOffY / Y : 0.0) - dColorOffset);
220                   G = max(0.0, (Y>0.0 ? G * dOffY / Y : 0.0) - dColorOffset);
221                   R = max(0.0, (Y>0.0 ? R * dOffY / Y : 0.0) - dColorOffset);
222                   Y = max(0.0, dOffY - dColorOffset);
223                }
224                double dOutB = B * fac;
225                double dOutG = G * fac;
226                double dOutR = R * fac;
227                double dOutY = Y * fac;
228                double dDiffY = dOutY - Y;
229                double dDiffB = dOutB - B;
230                double dDiffG = dOutG - G;
231                double dDiffR = dOutR - R;
232                double dDiffYContrib = dDiffY * dCBLuma;
233                dOutB = B + dDiffYContrib + dDiffB * dCBColor;
234                dOutG = G + dDiffYContrib + dDiffG * dCBColor;
235                dOutR = R + dDiffYContrib + dDiffR * dCBColor;
236                int iB = int(dOutB + 0.5); if (iB < 0) iB = 0; else if (iB >
237     65535) iB = 65535;
238                int iG = int(dOutG + 0.5); if (iG < 0) iG = 0; else if (iG >
239     65535) iG = 65535;
240                int iR = int(dOutR + 0.5); if (iR < 0) iR = 0; else if (iR >
241     65535) iR = 65535;
242                *pDst16++ = iR;
243                *pDst16++ = iG;
244                *pDst16++ = iB;
245                *pDst16++ = 0;
246                if(bExposureWarning)
247                {
248                   if ((pDst16[-4] == 65535 && pSrc16[-4] != 65535) ||
249                       (pDst16[-3] == 65535 && pSrc16[-3] != 65535) ||
250                       (pDst16[-2] == 65535 && pSrc16[-2] != 65535))
251                   {
252                      pDst16[-4] = 65535;
253                      pDst16[-3] = 0;
254                      pDst16[-2] = 0;
255                   }
256                   else if ((pDst16[-4] == 0 && pSrc16[-4] != 0) ||
257                            (pDst16[-3] == 0 && pSrc16[-3] != 0) ||
258                            (pDst16[-2] == 0 && pSrc16[-2] != 0))
```

```
259                 {
260                    pDst16[-4] = 0;
261                    pDst16[-3] = 65535;
262                    pDst16[-2] = 0;
263                 }
264              }
265           }
266        }
267        if (pCBFunc)
268        {
269           int nProg1 =   y   * 100 / bmihSrc.biHeight;
270           int nProg2 = (y+1) * 100 / bmihSrc.biHeight;
271           if (nProg2 > nProg1)
272           {
273              if (!pCBFunc(pCBParam, nProg2, 100))
274              {
275                 fRes = FALSE;
276                 break;
277              }
278           }
279        }
280     }
281     return fRes;
282  }
```

```
1   BOOL CLocalContrastEnhancement::CreateMinMaxDIBs(int  iRadiusShadows,  int
2   iRadiusHilites, BOOL bColorPriority, int iMethod, IP_CallbackFN pCBFunc,
3   void*pCBParam)
4   {
5      if (m_bCacheEnabled && m_pDIBMin && m_pDIBMax &&
6         iRadiusShadows == m_iCachedRadiusShadows  &&
7         iRadiusHilites == m_iCachedRadiusHilites  &&
8         bColorPriority == m_bCachedColorPriority  &&
9         iMethod        == m_iCachedMethod)
10        return TRUE;
11     SIZE si = { m_pDIBSrc->Width(), m_pDIBSrc->Height() };
12     delete m_pDIBMin;  m_pDIBMin = NULL;
13     delete m_pDIBMax;  m_pDIBMax = NULL;
14     delete m_pDIBY;    m_pDIBY   = NULL;
15     int fRes = TRUE;
16     if (m_pDIBSrc->BitsPP() == 24)
17     {
18        m_pDIBY = new DIB(si.cx, si.cy, 8, 256, NULL);
19        for (int y=0 ; y<si.cy ; y++)
20        {
21           const BYTE* pSrc = (const BYTE*)m_pDIBSrc->bits + y * m_pDIBSrc-
22   >BytesPerRow();
23           BYTE* pDst       = (BYTE*)       m_pDIBY->bits   + y * m_pDIBY-
24   >BytesPerRow();
25           for (int x=0 ; x<si.cx ; x++)
26           {
27              *pDst++ = GetPixelVal(pSrc); pSrc += 3;
28           }
29           if (pCBFunc && !pCBFunc(pCBParam, y, si.cy))
30           {
31              fRes = FALSE;
32              break;
33           }
```

```
34          }
35      }
36      else if (m_pDIBSrc->BitsPP() == 64)
37      {
38          m_pDIBY = new DIB(si.cx, si.cy, 16, 0, NULL, NULL, TRUE);
39          for (int y=0 ; y<si.cy ; y++)
40          {
41              const WORD* pSrc = (const WORD*)((const BYTE*)m_pDIBSrc->bits + y
42   * m_pDIBSrc->BytesPerRow());
43              WORD*       pDst =       (WORD*)((BYTE*)m_pDIBY->bits   +   y   *   m_pDIBY-
44   >BytesPerRow());
45              for (int x=0 ; x<si.cx ; x++)
46              {
47                  *pDst++ = GetPixelVal(pSrc); pSrc += 4;
48              }
49              if (pCBFunc && !pCBFunc(pCBParam, y, si.cy))
50              {
51                  fRes = FALSE;
52                  break;
53              }
54          }
55      }
56      if (fRes)
57      {
58          m_pDIBMin = new DIB(si.cx, si.cy, 8, 256, NULL);
59          m_pDIBMax = new DIB(si.cx, si.cy, 8, 256, NULL);
60          for (int i=0 ; i<256 ; i++)
61          {
62              if (m_pDIBMin)  memset(&m_pDIBMin->bmi->bmiColors[i],  i, 3);
63              if (m_pDIBMax)  memset(&m_pDIBMax->bmi->bmiColors[i],  i, 3);
64          }
65          fRes  =  IP_LocalMinMax(m_pDIBSrc->bmi,  m_pDIBSrc->bits,  m_pDIBMin-
66   >bits,  m_pDIBMax->bits,  iRadiusHilites,  iRadiusShadows,  bColorPriority,
67   iMethod, pCBFunc, pCBParam);
68      }
69      m_iCachedRadiusShadows = iRadiusShadows;
70      m_iCachedRadiusHilites = iRadiusHilites;
71      m_bCachedColorPriority = bColorPriority;
72      m_iCachedMethod        = iMethod;
73      if (!fRes)
74      {
75          delete m_pDIBMin;   m_pDIBMin = NULL;
76          delete m_pDIBMax;   m_pDIBMax = NULL;
77          delete m_pDIBY;     m_pDIBY   = NULL;
78      }
79      return fRes;
80  }

1   void CLocalContrastEnhancement::CreateResponseCurves(
2       double*   dShadows,    int    iShadowsLevel,    int    iShadowsContrast,    int
3   iShadowsThreshold0, int iShadowsThreshold1,
4       double*    dHilites,    int    iHilitesLevel,    int    iHilitesContrast,    int
5   iHilitesThreshold0, int iHilitesThreshold1)
6   {
7       double dGammaS = 25.0 - 4.6 * log((double)iShadowsContrast*2 + 1.0);
8       double dGammaH = 25.0 - 4.6 * log((double)iHilitesContrast*2 + 1.0);
9       double dMultMaxS = 10000.0;
10      double dMultMaxH = 10000.0;
```

```
11      for (int i=1 ; i<256 ; i++)
12      {
13          double     dAmtS      =       double(iShadowsThreshold1-i)       /
14  double(iShadowsThreshold1 - iShadowsThreshold0);
15          double     dAmtH      =       double(i-iShadowsThreshold0)       /
16  double(iShadowsThreshold1 - iShadowsThreshold0);
17          double dFacMaxS = (min(256, (i+30)*2.5) / double(i) - 1.0)  /
18  pow(dAmtS, dGammaS);
19          double dFacMaxH = (i/double(256-i)) / pow(dAmtH, dGammaH);
20          if (i<200 && dFacMaxS < dMultMaxS) dMultMaxS = dFacMaxS;
21          if (i>50  && dFacMaxH < dMultMaxH) dMultMaxH = dFacMaxH;
22      }
23      double dShadowsMult = iShadowsLevel * dMultMaxS / 100.0;
24      double dHilitesMult = iHilitesLevel * dMultMaxH / 100.0;
25      for (int i=0 ; i<256 ; i++)
26      {
27          if (i <= iShadowsThreshold0)
28              dShadows[i] = 1.0 + dShadowsMult;
29          else if (i >= iShadowsThreshold1)
30              dShadows[i] = 1.0;
31          else
32          {
33              double     dAmt       =       double(iShadowsThreshold1-i)       /
34  double(iShadowsThreshold1 - iShadowsThreshold0);
35              dShadows[i] = 1.0 + (pow(dAmt, dGammaS) * dShadowsMult);
36          }
37          if (i <= iHilitesThreshold0)
38              dHilites[i] = 1.0;
39          else if (i >= iHilitesThreshold1)
40              dHilites[i] = 1.0 + dHilitesMult;
41          else
42          {
43              double     dAmt       =       double(i-iHilitesThreshold0)       /
44  double(iHilitesThreshold1 - iHilitesThreshold0);
45              dHilites[i] = 1.0 + (pow(dAmt, dGammaH) * dHilitesMult);
46          }
47      }
48  }
```

What is claimed is:

1. A computer processor-based method for contrast enhancement for digital images, comprising:
   filtering, by a computer processor controlled electronic device, an original image, denoted ORIG, having original color values ORIG(i,j), to generate a first filtered image, denoted F1, and a second filtered image, denoted F2, wherein the first and second filtered images have smooth local color variation relative to the original image;
   deriving, by the electronic device, local highlight scale factors, denoted LH(i,j), by applying a variable highlight response curve, denoted HRC, to the first filtered image, LH(i,j)=HRC(F1($i,j$));
   deriving, by the electronic device, local shadow scale factors, denoted LS(i,j), by applying a variable shadow response curve, denoted SRC, to the second filtered image, LS(i,j)=SRC(F2($i,j$));
   deriving, by the electronic device, local offset values, denoted OFST(i,j), by applying an offset curve, denoted OC, to the first filtered image, OFST(i,j)=OC(F1($i,j$)); and
   processing, by the electronic device, the original image ORIG, comprising:
      subtracting the local offset values from the original color values to generate shifted color values;
      scaling the shifted color values by the local highlight scale factors; and
      further scaling the shifted color values by the local shadow scale factors, thereby generating a contrast-enhanced image from the original image, ENHNCD=LS*LH*(ORIG−OFST).

2. The method of claim 1 wherein the first and second filtered images F1 and F2 are the same image.

3. The method of claim 2 wherein the first and second filtered images F1 and F2 are obtained from luminance color values of the original image ORIG.

4. The method of claim 1 wherein the first and second filtered images F1 and F2 are different images.

5. The method of claim 4 wherein the first filtered image F1 is obtained from minimum red-green-blue color values of the original image ORIG, and wherein the second filtered image F2 is obtained from maximum red-green-blue color values of the original image ORIG.

6. The method of claim 1 wherein the first and second filtered images F1 and F2 are computed using medians.

7. The method of claim 6 wherein the medians are medians of sub-averages.

8. The method of claim 1 wherein the first and second filtered images F1 and F2 are computed using weighted averages.

9. The method of claim 8 wherein the weighted averages are weighted averages of sub-averages.

10. The method of claim 8 wherein the weighted averages use weight coefficients that have an inverse gradient dependency on input values.

11. The method of claim 8 wherein the weighted averages use weight coefficients that have an inverse distance dependency on input positions.

12. The method of claim 1 wherein said filtering is based on values of at least one parameter, and further comprising setting at least one such parameter value by a user.

13. The method of claim 12 further comprising rendering, by the electronic device, the contrast-enhanced image ENHNCD on a display device, and wherein said setting at least one such parameter value is performed in response to said rendering.

14. The method of claim 13 wherein said processing, said rendering and said setting at least one such parameter value are performed repeatedly until a satisfactory contrast-enhanced image ENHNCD is obtained.

15. The method of claim 1 wherein said deriving local highlight scale factors LH comprises receiving at least one parameter value set by a user for determining the highlight response curve HRC, and wherein said deriving local shadow scale factors LS comprises receiving at least one parameter value set by a user for determining the shadow response curve SRC.

16. The method of claim 15 further comprising rendering, by the electronic device, the contrast-enhanced image ENHNCD on a display device, and wherein said setting at least one such parameter value is performed in response to said rendering.

17. The method of claim 16 wherein said processing, said rendering and said setting at least one such parameter value are performed repeatedly until a satisfactory contrast-enhanced image ENHNCD is obtained.

18. A non-transitory computer readable storage medium containing instructions which when executed implement a system for enhancing contrast of digital images, comprising:
   instructions for a filter processor for filtering an original image, denoted ORIG, having original color values ORIG(i,j), to generate a first filtered image, denoted F1, and a second filtered image, wherein the first and second filtered images have smooth local color variation relative to the original image; and
   instructions for an image enhancer coupled to said filter processor for (i) deriving local highlight linear scale factors, denoted LH(i,j), by applying a variable highlight response curve, denoted HRC, to the first filtered image, LH(i,j)=HRC(F1($i,j$)), (ii) deriving local shadow linear scale factors, denoted LS(i,j), by applying a variable shadow response curve, denoted SRC, to the second filtered image, LS(i,j)=SRC(F2($i,j$)), (iii) deriving local offset values, denoted OFST(i,j), by applying an offset curve, denoted OC, to the first filtered image, OFST(i, j)= OC(F1($i,j$)), (iv) subtracting the local offset values from the original color values to generate shifted color values, (v) scaling the shifted color values by the local highlight scale factors, and (vi) further scaling the shifted color values by the local shadow scale factors, thereby generating a contrast-enhanced image from the original image, ENHNCD=LS*LH*(ORIG−OFST).

19. The medium of claim 18 wherein the first and second filtered images F1 and F2 are the same image.

20. The medium of claim 19 wherein the first and second filtered images F1 and F2 are obtained from luminance color values of the original image ORIG.

21. The medium of claim 18 wherein the first and second filtered images F1 and F2 are different images.

22. The medium of claim 21 wherein the first filtered image F1 is obtained from minimum red-green-blue color values of the original image ORIG, and wherein the second filtered image F2 is obtained from maximum red-green-blue color values of the original image ORIG.

23. The medium of claim 18 wherein said filter processor uses medians.

24. The medium of claim 23 wherein the medians are medians of sub-averages.

25. The medium of claim 18 wherein said filter processor uses weighted averages.

26. The medium of claim 25 wherein the weighted averages are weighted averages of sub-averages.

27. The medium of claim 25 wherein the weighted averages use weight coefficients that have an inverse gradient dependency on input values.

28. The medium of claim 25 wherein the weighted averages use weight coefficients that have an inverse distance dependency on input positions.

29. The medium of claim 18 wherein said filter processor uses values of at least one parameter, and further comprising instructions for a user interface for setting at least one such parameter value by a user.

30. The medium of claim 29 wherein said user interface renders the contrast-enhanced image ENHNCD on a display device, and wherein the user sets at least one such parameter value in response to viewing the contrast-enhanced image ENHNCD on the display device.

31. The medium of claim 18 wherein said image enhancer uses values of at least one parameter, and further comprising instructions for a user interface for setting at least one such parameter value by a user.

32. The medium of claim 31 wherein said user interface renders the contrast-enhanced image ENHNCD on a display device, and wherein the user sets at least one such parameter value in response to viewing the contrast-enhanced image ENHNCD on the display device.

33. A computer processor-based method for contrast enhancement for digital images, comprising:
    filtering, by a computer processor controlled electronic device, an original image, denoted ORIG, having original color values ORIG(i,j), to generate a filtered image, denoted F, wherein the filtered image has smooth local color variation relative to the original image;
    deriving, by the electronic device, local highlight linear scale factors, denoted LH(i,j), by applying a variable highlight response curve, denoted HRC, to the filtered image, LH(i,j)=HRC(F(i,j));
    deriving, by the electronic device, local offset values, denoted OFST(i,j), by applying an offset curve, denoted OC, to the filtered image, OFST(I,j)=OC(F(i,j)); and
    processing, by the electronic device, the original image ORIG, comprising:
        subtracting the local offset values from the original color values to generate shifted color values; and
        scaling the shifted color values by the local highlight scale factors, thereby generating a contrast-enhanced image from the original image, ENHNCD=LH*(ORIG−OFST).

34. A computer processor-based method for contrast enhancement for digital images, comprising:
    filtering, by a computer processor controller electronic device, an original image, denoted ORIG, having original color values ORIG(i,j), to generate a filtered image, denoted F, wherein the filtered image has smooth local color variation relative to the original image;
    deriving, by the electronic device, local shadow linear scale factors, denoted LS(i,j), by applying a variable shadow response curve, denoted SRC, to the filtered image, LS(i,j)=SRC(F(i,j)); and
    processing, by the electronic device, the original image ORIG, comprising scaling the original color values by the local shadow scale factors, thereby generating a contrast-enhanced image from the original image, ENHNCD=LS*ORIG.

35. A non-transitory computer readable storage medium containing instructions which when executed implement a system for enhancing contrast of digital images, comprising:
    instructions for a filter processor for filtering an original image, denoted ORIG, having original color values ORIG(i,j), to generate a filtered image, denoted F, wherein the filtered image has smooth local color variation relative to the original image; and
    instructions for an image enhancer coupled to said filter processor for (i) deriving local highlight local scale factors, denoted LH(i,j), by applying a variable highlight response curve, denoted HRC, to the filtered image, LH(i,j)=HRC(F(i,j)), (ii) deriving local offset values, denoted OFST(i,j), by applying an offset curve, denoted OC, to the filtered image, OFST(i,j)=OC(F(i,j)), (iii) subtracting the local offset values from the original color values to generate shifted color values, and (iv) scaling the shifted color values by the local highlight scale factors, thereby generating a contrast-enhanced image from the original image, ENHNCD=LH*(ORIG−OFST).

36. A non-transitory computer readable storage medium containing instructions which when executed implement a system for enhancing contrast of digital images, comprising:
    instructions for a filter processor for filtering an original image, denoted ORIG, having original color values ORIG(i,j), to generate a filtered image, denoted F, wherein the filtered image has smooth local color variation relative to the original image; and
    instructions for an image enhancer coupled to said filter processor for (i) deriving local shadow linear scale factors, denoted LS(i,j), by applying a variable shadow response curve, denoted SRC, to the filtered image, LS(i,j)=SRC(F(i,j)), and (ii) scaling the original color values by the local shadow scale factors, thereby generating a contrast-enhanced image from the original image, ENHNCD=LS*ORIG.

37. The method of claim 1 wherein the highlight response curve HRC is a function of color value that increases from a response value of one, corresponding to a color value of zero, to a response value greater than one, corresponding to a maximum color value, and the shadow response curve SRC is a function of color value that decreases from a response value greater than one, corresponding to a color value of zero, to a response value of one, corresponding to a maximum color value.

38. The method of claim 15 wherein the highlight response curve is determined by $HRC(x)=1+a*(x/S)^b$, for non-zero parameters a and b that may be set by a user, where S denotes the largest possible value for x, wherein the shadow response curve is determined by $SRC(x)=1+c*(1-x/S)^d$, for non-zero parameters c and d that may be set by a user, and wherein the offset curve is determined by $OC(x)=S*[1-1/HRC(x)]$.

39. The medium of claim 18 wherein the highlight response curve HRC is a function of color value that increases from a response value of one, corresponding to a color value of zero, to a response value greater than one, corresponding to a maximum color value, and the shadow response curve SRC is a function of color value that decreases from a response value greater than one, corresponding to a color value of zero, to a response value of one, corresponding to a maximum color value.

40. The medium of claim 31 wherein the highlight response curve is determined by $HRC(x)=1+a*(x/S)^b$, for non-zero parameters a and b that may be set by a user, where S denotes the largest possible value for x, wherein the shadow response curve is determined by $SRC(x)=1+c*(1-x/S)^d$, for non-zero parameters c and d that may be set by a user, and wherein the offset curve is determined by $OC(x)=S*[1-1/HRC(x)]$.

41. The method of claim 33 wherein the highlight response curve HRC is a function of color value that increases from a response value of one, corresponding to a color value of zero, to a response value greater than one, corresponding to a maximum color value.

42. The method of claim 34 wherein the shadow response curve SRC is a function of color value that decreases from a response value greater than one, corresponding to a color value of zero, to a response value of one, corresponding to a maximum color value.

43. The medium of claim 35 wherein the highlight response curve HRC is a function of color value that increases from a response value of one, corresponding to a color value of zero, to a response value greater than one, corresponding to a maximum color value.

44. The medium of claim 36 wherein the shadow response curve SRC is a function of color value that decreases from a response value greater than one, corresponding to a color value of zero, to a response value of one, corresponding to a maximum color value.

* * * * *